(12) United States Patent
Hira

(10) Patent No.: US 11,444,466 B2
(45) Date of Patent: Sep. 13, 2022

(54) CHARGING SYSTEM FOR DIVERSE BATTERIES

(71) Applicant: TOSHIBA MITSUBISHI-ELECTRIC INDUSTRIAL SYSTEMS CORPORATION, Chuo-ku (JP)

(72) Inventor: Katsuya Hira, Tokyo (JP)

(73) Assignee: TOSHIBA MITSUBISHI-ELECTRIC INDUSTRIAL SYSTEMS CORPORATION, Chuo-ku (JP)

(*) Notice: Subject to any disclaimer, the term of this patent is extended or adjusted under 35 U.S.C. 154(b) by 0 days.

(21) Appl. No.: 17/050,758

(22) PCT Filed: Apr. 24, 2019

(86) PCT No.: PCT/JP2019/017422
§ 371 (c)(1),
(2) Date: Oct. 26, 2020

(87) PCT Pub. No.: WO2020/217339
PCT Pub. Date: Oct. 29, 2020

(65) Prior Publication Data
US 2022/0037900 A1 Feb. 3, 2022

(51) Int. Cl.
*H02J 7/00* (2006.01)
*H02J 3/32* (2006.01)
*H02J 3/38* (2006.01)

(52) U.S. Cl.
CPC ............ *H02J 7/00047* (2020.01); *H02J 3/32* (2013.01); *H02J 3/381* (2013.01); *H02J 7/0013* (2013.01);
(Continued)

(58) Field of Classification Search
CPC ........ H02J 7/00047; H02J 7/0048; H02J 3/32; H02J 3/381; H02J 7/0013; H02J 2300/28;
(Continued)

(56) References Cited

U.S. PATENT DOCUMENTS 9,948,119 B2 * 4/2018 McMorrow ............... H02J 3/32
2013/0335026 A1 12/2013 Reynolds et al.
(Continued)

FOREIGN PATENT DOCUMENTS

JP 2012-205490 A 10/2012
JP 2013-255404 A 12/2013
(Continued)

OTHER PUBLICATIONS

International Search Report and Written Opinion dated Jul. 7, 2019 in PCT/JP2019/017422 filed Apr. 24, 2019, 8 pages (with Translation of Categories).

(Continued)

*Primary Examiner* — Michael R. Fin
(74) *Attorney, Agent, or Firm* — Oblon, McClelland, Maier & Neustadt, L.L.P.

(57) ABSTRACT

A power system includes a plurality of storage battery facilities constructed to be interconnected to an electric power grid, and a multi-storage battery control apparatus configured to control the plurality of storage battery facilities, the plurality of storage battery facilities include a first storage battery facility including at least one first storage battery, and a second storage battery facility including at least one second storage battery, the first storage battery is different from the second storage battery in type, and the multi-storage battery control apparatus is constructed to selectively use the first storage battery facility or the second storage battery facility in accordance with a plurality of different types of application.

2 Claims, 28 Drawing Sheets

(52) U.S. Cl.
CPC ......... *H02J 7/0048* (2020.01); *H02J 2300/24* (2020.01); *H02J 2300/28* (2020.01); *H02J 2300/40* (2020.01)

(58) Field of Classification Search
CPC .. H02J 2300/40; H02J 2300/24; H02J 7/0063; H02J 7/0021; H02J 2007/0067; H02J 7/0024; B60L 58/21
USPC .................................... 307/72; 320/164, 162
See application file for complete search history.

(56) References Cited

U.S. PATENT DOCUMENTS

| | | |
|---|---|---|
| 2014/0015471 A1 | 1/2014 | May |
| 2014/0266061 A1* | 9/2014 | Wachal ............... H02J 7/00036 320/134 |
| 2018/0226811 A1 | 8/2018 | Hanada et al. |

FOREIGN PATENT DOCUMENTS

| | | |
|---|---|---|
| JP | 2014-131369 A | 7/2014 |
| JP | 2014-236602 A | 12/2014 |
| JP | 2016-146688 A | 8/2016 |

OTHER PUBLICATIONS

International Preliminary Report on Patentability dated Jul. 8, 2020 in PCT/JP2019/017422 filed Apr. 24, 2019, 12 pages.
English translation of the International Preliminary Report on Patentability dated Oct. 28, 2021 in PCT/JP2019/017422 filed Apr. 24, 2019, 9 pages.
Indian Office Action dated Apr. 6, 2021 in Indian Patent Application No. 202017047090 (with English translation), 5 pages.

* cited by examiner

<u>35a</u>

| No. | CHARGE-DISCHARGE APPLICATION | |
|---|---|---|
| FIRST STORAGE BATTERY FACILITY | INSTANTANEOUS | GRID STABILIZATION |
| SECOND STORAGE BATTERY FACILITY | MEDIUM-TERM | LOAD REDUCTION |
| THIRD STORAGE BATTERY FACILITY | LONG-TERM | POWER OUTAGE BACKUP |

| No. | BATTERY TYPE | RATED CAPACITY (kWh) | FOR INSTANT | FOR MIDDLE -TERM | FOR LONG -TERM | SOC LOWER LIMIT (%) | SOC UPPER LIMIT (%) | SOC (%) | CHARGE LIMIT (kW) | DISCHARGE LIMIT (kW) | STARTUP POWER AMOUNT FOR LONG- TERM (kwH) |
|---|---|---|---|---|---|---|---|---|---|---|---|
| 1 | EDLC | 1 | ○ | | | 10 | 90 | 20 | -950 | 950 | — |
| 2 | LIC | 1 | ○ | | | 10 | 90 | 40 | -950 | 950 | — |
| 3 | LIB | 1 | ○ | | | 10 | 90 | 60 | -950 | 950 | — |
| 4 | SciB (TM) | 1 | ○ | | | 10 | 90 | 50 | -950 | 950 | — |
| 5 | LEAD | 1 | | ○ | | 10 | 90 | 70 | -950 | 950 | — |
| 6 | Nas | 16 | | | ○ | 10 | 90 | 80 | -950 | 950 | 20 |
| 7 | FC | 20 | | | ○ | 10 | 90 | 85 | -950 | 950 | 10 |

SETTING DATA — CURRENT VALUE

NOTE
MINUS VALUES EXPRESS "CHARGE"
PLUS VALUES EXPRESS "DISCHARGE"

PV POWER GENERATION STATUS DB (EXAMPLE)

| No. | NAME | RATED CAPACITY (kW) | DC CURRENT (A) | DC VOLTAGE (V) | DC POWER (kW) | ACTIVE POWER (kW) | REACTIVE POWER (kvar) | FREQUENCY (Hz) | VOLTAGE (V) | POWER FACTOR |
|---|---|---|---|---|---|---|---|---|---|---|
| 1 | PV-PCS-1 | 1000 | 874.3 | 1050.0 | 918.0 | 900.0 | 0.0 | 60.1 | 379.5 | 1.00 |
| 2 | PV-PCS-2 | 1000 | 864.5 | 1050.1 | 907.8 | 890.0 | 0.0 | 60.1 | 380.0 | 1.00 |
| 3 | PV-PCS-3 | 1000 | 884.1 | 1049.9 | 928.2 | 910.0 | 0.0 | 60.1 | 379.8 | 1.00 |
| 4 | PV-PCS-4 | 1000 | 879.1 | 1050.1 | 923.1 | 906.0 | 0.0 | 60.1 | 379.7 | 1.00 |
| 5 | PV-PCS-5 | 1000 | 869.4 | 1050.0 | 912.9 | 895.0 | 0.0 | 60.1 | 379.9 | 1.00 |
| 6 | PV-PCS-6 | 1000 | 908.8 | 1010.1 | 918.0 | 900.0 | 0.0 | 60.1 | 380.0 | 1.00 |
| 7 | PV-PCS-7 | 1000 | 914.1 | 1009.9 | 923.1 | 906.0 | 0.0 | 60.1 | 379.6 | 1.00 |

SETTING DATA — CURRENT VALUE

WIND POWER GENERATION STATUS DB (EXAMPLE)

| No. | NAME | RATED CAPACITY (kW) | DC CURRENT (A) | DC VOLTAGE (V) | DC POWER (kW) | ACTIVE POWER (kW) | REACTIVE POWER (kvar) | FREQUENCY (Hz) | VOLTAGE (V) | POWER FACTOR |
|---|---|---|---|---|---|---|---|---|---|---|
| 1 | MV-PCS-1 | 1000 | 902.0 | 1020.0 | 920.0 | 890.0 | 0.0 | 60.1 | 379.6 | 1.00 |
| 2 | MV-PCS-2 | 1000 | 902.8 | 1018.5 | 919.5 | 885.5 | 0.0 | 60.1 | 380.0 | 1.00 |
| 3 | MV-PCS-3 | 1000 | 902.9 | 1019.5 | 920.5 | 881.3 | 0.0 | 60.1 | 379.8 | 1.00 |
| 4 | MV-PCS-4 | 1000 | 902.4 | 1019.3 | 919.8 | 881.1 | 0.0 | 60.1 | 379.7 | 1.00 |
| 5 | MV-PCS-5 | 1000 | 902.8 | 1019.2 | 920.1 | 891.1 | 0.0 | 60.1 | 379.9 | 1.00 |
| 6 | MV-PCS-6 | 1000 | 903.8 | 1018.1 | 920.2 | 891.5 | 0.0 | 60.1 | 379.6 | 1.00 |
| 7 | MV-PCS-7 | 1000 | 903.6 | 1018.2 | 920.0 | 891.3 | 0.0 | 60.1 | 380.1 | 1.00 |

SETTING DATA — CURRENT VALUE

LOAD STATUS DB (EXAMPLE)

| No. | NAME | RATED CAPACITY (kW) | POWER USAGE AMOUNT (kW) |
|---|---|---|---|
| 1 | LOAD 1 | 500 | 475.0 |
| 2 | LOAD 2 | 500 | 450.0 |
| 3 | PEAK-CUT LEVEL | 1000 | 925.0 |

SETTING DATA — CURRENT VALUE

FIG. 9

| No. | NAME | LOAD PLAN (kWH) | LOAD RESULT (kWH) |
|---|---|---|---|
| 1 | JANUARY | 180, 420 | 198, 420 |
| 2 | FEBRUARY | 160, 960 | 154, 812 |
| 3 | MARCH | 223, 200 | 234, 360 |
| 4 | APRIL | 162, 000 | 170, 100 |
| 5 | MAY | 176, 700 | 159, 030 |
| 6 | JUNE | 171, 000 | 166, 725 |
| 7 | JULY | 180, 420 | 189, 441 |
| 8 | AUGUST | 180, 420 | 198, 462 |
| 9 | SPTEMBER | 228, 000 | 223, 440 |
| 10 | OCTOBER | 167, 400 | 150, 660 |
| 11 | NOVEMBER | 171, 000 | 145, 350 |
| 12 | DECEMBER | 180, 420 | 162, 378 |

SETTING DATA — CURRENT VALUE

FIG. 10

| No. | NAME | LOAD PLAN (kWH) | LOAD RESULT (kWH) |
|---|---|---|---|
| 1 | MONDAY | 6, 320 | 6, 952 |
| 2 | TUESDAY | 6, 320 | 6, 004 |
| 3 | WEDNESDAY | 7, 700 | 8, 085 |
| 4 | THURSDAY | 5, 900 | 6, 195 |
| 5 | FRIDAY | 6, 200 | 5, 580 |
| 6 | SATURDAY | 6, 200 | 6, 045 |
| 7 | SUNDAY | 2, 820 | 2, 961 |

SETTING DATA — CURRENT VALUE

FIG. 11

| No. | NAME | LOAD PLAN (kWH) | LOAD RESULT (kWH) |
|---|---|---|---|
| 1 | 0:00-0:59 | 43 | 47 |
| 2 | 1:00-1:59 | 43 | 40 |
| 3 | 2:00-2:59 | 30 | 32 |
| 4 | 3:00-3:59 | 25 | 26 |
| 5 | 4:00-4:59 | 38 | 34 |
| 6 | 5:00-5:59 | 38 | 37 |
| 7 | 6:00-6:59 | 43 | 45 |
| 8 | 7:00-7:59 | 143 | 157 |
| 9 | 8:00-8:59 | 443 | 420 |
| 10 | 9:00-9:59 | 500 | 525 |
| 11 | 10:00-10:59 | 425 | 446 |
| 12 | 11:00-11.59 | 438 | 394 |
| 13 | 12:00-12:59 | 438 | 427 |
| 14 | 13:00-13:59 | 443 | 465 |
| 15 | 14:00-14:59 | 443 | 487 |
| 16 | 15:00-15:59 | 443 | 420 |
| 17 | 16:00-16:59 | 500 | 525 |
| 18 | 17:00-17:59 | 425 | 446 |
| 19 | 18:00-18:59 | 238 | 214 |
| 20 | 19:00-19:59 | 238 | 232 |
| 21 | 20:00-20:59 | 243 | 255 |
| 22 | 21:00-21:59 | 243 | 267 |
| 23 | 22:00-22:59 | 43 | 40 |
| 24 | 23:00-23:59 | 43 | 40 |

SETTING DATA (No., NAME, LOAD PLAN) — CURRENT VALUE (LOAD RESULT)

DETERMINE CHARGE-DISCHARGE AMOUNT FOR EACH STRAGE BATTERY (FOR LONG-TERM CHARGE-DISCHRGE)

CHARGING SYSTEM FOR DIVERSE BATTERIES

FIELD

The present application relates to a power system.

BACKGROUND

Conventionally, for example, as disclosed in JP 2013-255404 A, a versatile charging apparatus which can support a plurality of types of storage batteries is known. Further, an emergency power supply apparatus which copes with disasters, including this charging apparatus, is also provided.

According to FIG. 2 and description in paragraph 0018 of JP 2013-255404 A, a multi-charging apparatus can be selectively connected to one of a plurality of types of storage batteries through a switch. According to description in paragraph 0020 of JP 2013-255404 A, a power supply from a power generation apparatus is supplied to one of the storage batteries at a normal time, and a charging pattern corresponding to a type of the storage battery which is connected is called and executed at the multi-charging apparatus during charge.

Meanwhile, concerning use of power of storage batteries, according to, for example, FIG. 2 and description in paragraph 0021 of JP 2013-255404 A, a plurality of storage batteries are collectively connected to an inverter unit during power outage. By this means, power of a plurality of storage batteries is collectively supplied to a load during power outage.

CITATION LIST

Patent Literature

[PTL 1] JP 2013-255404 A

SUMMARY

Technical Problem

In the above-described related art, during discharge, discharge of the storage batteries of different types is collectively controlled in a state where all of a plurality of types of storage batteries are collectively connected in parallel. That is, the individual storage batteries are dealt with without distinction during discharge. Because such a way of dealing with the storage batteries does not sufficiently take advantage of the characteristics of a system configuration including a plurality of types of storage batteries, there has been still room for improvement in the above-described related art.

The present application has been made to solve the problem as described above, and is directed to providing a power system which has been improved so as to be able to take advantage of a system configuration including different types of a plurality of storage batteries.

Solution to Problem

A power system according to the present application includes a plurality of storage battery facilities constructed to be interconnected to an electric power grid, and a multi-storage storage battery control apparatus configured to control the plurality of storage battery facilities, the plurality of storage battery facilities including a first storage battery facility including at least one first storage battery, and a second storage battery facility including at least one second storage battery, the first storage battery being different from the second storage battery in type, and the multi-storage battery control apparatus being constructed to selectively use the first storage battery facility or the second storage battery facility in accordance with a plurality of different types of charge-discharge application.

As "selective use of a storage battery facility in accordance with charge-discharge application" according to the present application, at least the following various aspects may be provided.

As a first aspect of selective use, the following power system may be provided. The plurality of storage battery facilities may include a third storage battery facility including at least one third storage battery. The first storage battery, the second storage battery and the third storage battery may be different from one another in type. The plurality of types of charge-discharge application may include application for instantaneous charge-discharge determined in advance, application for medium-term charge-discharge determined in advance, and application for long-term charge-discharge determined in advance. In this case, the multi-storage battery control apparatus may be constructed to use the first storage battery facility for the application for instantaneous charge-discharge, use the second storage battery facility for the application for medium-term charge-discharge, and use the third storage battery facility for the application for long-term charge-discharge.

As a second aspect of selective use, the following power system may be provided. The multi-storage battery control apparatus may have a storage battery correspondence rule which determines in advance correspondence relationship between the plurality of types of charge-discharge application, and the first storage battery facility and the second storage battery facility. The multi-storage battery control apparatus may be constructed to perform charge-discharge control of a storage battery belonging to a target storage battery facility which becomes a target of specific charge-discharge application among the plurality of storage battery facilities in accordance with the storage battery correspondence rule in a case where the specific charge-discharge application is designated among the plurality of types of charge-discharge application.

As a third aspect of selective use, the following power system may be provided. The multi-storage battery control apparatus may be constructed to respectively calculate a first charge-discharge amount for first charge-discharge application and a second charge-discharge amount for second charge-discharge application different from the first charge-discharge application, control charge-discharge of the first storage battery facility on the basis of the first charge-discharge amount, and control charge-discharge of the second storage battery facility on the basis of the second charge-discharge amount.

Note that the above-described power system may further include a renewable energy power generation facility constructed to be interconnected to an electric power grid, and a grid side switching apparatus configured to switch states of the renewable energy power generation facility and the plurality of storage battery facilities between connection and disconnection to the electric power grid. The multi-storage battery control apparatus may be constructed to control respective charge-discharge amounts of the first storage battery facility and the second storage battery facility for realizing interconnection with the electric power grid by the renewable energy power generation facility and the plurality of storage battery facilities in a state where the grid side switching apparatus is closed.

Advantageous Effects of Invention

According to a power system of the present application, a multi-storage battery control apparatus which is capable of selectively using different types of storage batteries in accordance with charge-discharge application is provided. By this means, it becomes possible to use a storage battery appropriate for each type of application in accordance with charge-discharge application. Therefore, it is possible to take advantages of a system configuration including a plurality of different types of storage batteries.

BRIEF DESCRIPTION OF DRAWINGS

FIG. 5 is a view illustrating various kinds of data stored in the multi-storage battery control apparatus in the power system according to an example of the present application.

FIG. 6 is a view illustrating various kinds of data stored in the multi-storage battery control apparatus in the power system according to the example of the present application.

FIG. 7 is a view illustrating various kinds of data stored in the multi-storage battery control apparatus in the power system according to the example of the present application.

FIG. 8 is a view illustrating various kinds of data stored in the multi-storage battery control apparatus in the power system according to the example of the present application.

FIG. 9 is a view illustrating various kinds of data stored in the multi-storage battery control apparatus in the power system according to the example of the present application.

FIG. 10 is a view illustrating various kinds of data stored in the multi-storage battery control apparatus in the power system according to the example of the present application.

FIG. 11 is a view illustrating various kinds of data stored in the multi-storage battery control apparatus in the power system according to the example of the present application.

DESCRIPTION OF EMBODIMENTS

One storage battery facility according to the present specification may be configured with a plurality of storage batteries or may be configured with only one storage battery. All of a plurality of storage battery facilities provided in a power system may be storage battery facilities configured with only one storage battery. Types of a plurality of storage batteries included in the storage battery facility may be different from each other or may be all the same.

In the present specification, "charge-discharge" means "operation of one of charge and discharge". A "charge-discharge amount" includes a charge amount and a discharge amount. An expression form of the charge-discharge amount is not limited, and various methods which can distinguish between charge and discharge may be used.

As an example, it is also possible to distinguish between charge and discharge using a positive/negative sign. In a case of discharge, because power is output from a storage battery, a positive sign (+) may be assigned. In a case of charge, because power is absorbed into a storage battery, a negative sign (−) may be assigned. In this example, a charge-discharge amount meaning "discharge of 100 W" may be expressed as "+100 W". A charge-discharge amount meaning "charge of 100 W" may be expressed as "−100 W". In the embodiment, such an expression method will be used as an example. Note that an arbitrary identifier other than a positive/negative sign may be used.

As a modified example, a charge-discharge amount may be provided as a pair of parameters (x, y) indicating a charge amount x and a discharge amount y. In this example, when charge is performed, by parameters (100 W, 0 W) being provided, a specific value 100 W may be assigned to the charge amount x, and the discharge amount y may be set at 0 (0 W). Inversely, when discharge is performed, by parameters (0 W, 100 W) being provided, the charge amount x may be set at 0 (0 W), and a specific value 100 W may be assigned to the discharge amount y.

[System Configuration of Embodiment]

Figure 1:
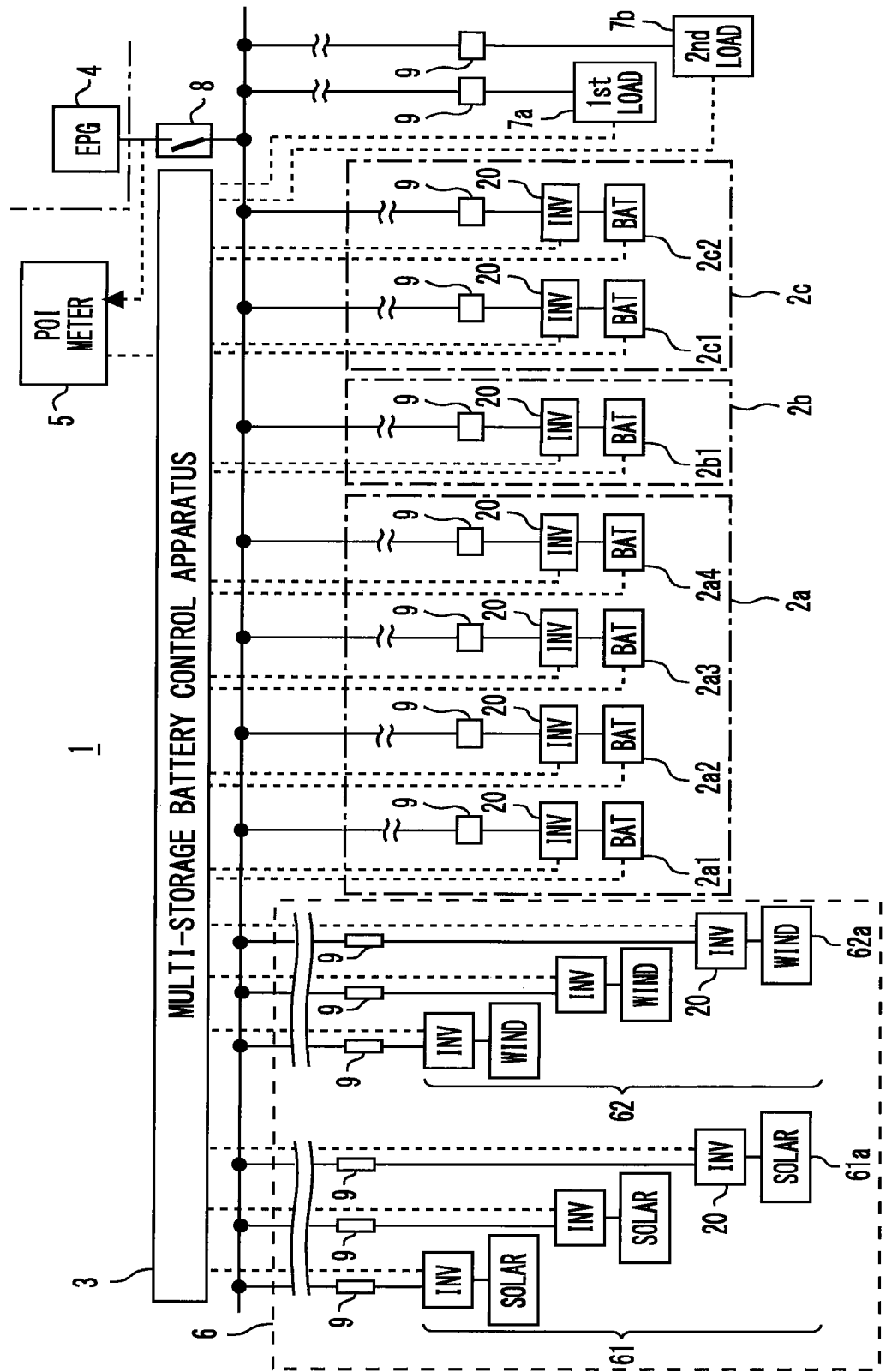
FIG. 1 is a view illustrating a configuration of a power system according to an embodiment of the present application.

FIG. 1 is a view illustrating a configuration of a power system 1 according to the embodiment of the present application. The power system 1 includes a plurality of storage battery facilities 2a, 2b, 2c, a multi-storage battery control apparatus 3 which controls the plurality of storage battery facilities 2a, 2b, 2c, a POI meter 5 which is an electric power meter, a renewable energy power generation facility 6, a first load 7a, a second load 7b, a grid side switching apparatus 8 and a plurality of switching apparatuses 9.

The plurality of storage battery facilities 2a, 2b, 2c are constructed to be interconnected to an electric power grid 4. The plurality of storage battery facilities 2a, 2b, 2c include a first storage battery facility 2a including first storage batteries 2a1 to 2a4, a second storage battery facility 2b including a second storage battery 2b1, and a third storage battery facility 2c including third storage batteries 2c1 to 2c2.

Types of the first storage batteries 2a1 to 2a4, the second storage battery 2b1 and the third storage batteries 2c1 to 2c2 are different from each other. Specifically, concerning a difference in type, the first storage batteries 2a1 to 2a4, the second storage battery 2b1 and the third storage batteries 2c1 to 2c2 may be storage batteries of different types selected from a group of an electric double layer capacitor (EDLC), a lithium ion capacitor (LIC), a lithium ion secondary battery (LIB), a nickel-hydrogen battery, SciB (registered trademark), a lead storage battery, a sodium-sulfur battery (Nas) and a fuel cell (FC). Because structures, principle or chemical action of these storage batteries are different from each other, these storage batteries are different types of storage batteries.

In the embodiment, as an example, the following storage battery facility configuration is employed. Storage batteries included in the first storage battery facility 2a are the first storage battery 2a1 which is an EDLC, the first storage battery 2a2 which is an LIC, the first storage battery 2a3 which is an LIB, and the first storage battery 2a4 which is SciB (registered trademark). A storage battery included in the second storage battery facility 2b is a lead storage battery. Storage batteries included in the third storage battery facility 2c are the third storage battery 2c1 which is a sodium-sulfur battery (Nas), and the third storage battery 2c2 which is a fuel cell.

Details of the multi-storage battery control apparatus 3 will be described later using FIG. 2. The electric power grid 4 is a three-phase commercial electric power grid as an example. The POI meter 5 transmits a value obtained by measuring a power parameter of the electric power grid 4 to the multi-storage battery control apparatus 3.

The renewable energy power generation facility 6 is constructed to be interconnected to the electric power grid 4. The renewable energy power generation facility 6 includes a photovoltaic power generation facility 61, and a wind power generation facility 62. The photovoltaic power generation facility 61 includes a plurality of solar cell arrays 61a, and a plurality of power conversion apparatuses 20 respectively connected to the plurality of solar cell arrays 61a. The wind power generation facility 62 includes a plurality of wind power generators 62a and a plurality of power conversion apparatuses 20 respectively connected to the plurality of wind power generators 62a.

The grid side switching apparatus 8 switches a state of the power system 1 between connection and disconnection to the electric power grid 4. As an example, while power outage occurs at the electric power grid 4, the power system 1 is disconnected from the electric power grid 4 by the grid side switching apparatus 8 being opened.

The plurality of switching apparatuses 9 include a plurality of switching apparatuses (storage battery side switching apparatuses) 9 respectively provided between the grid side switching apparatus 8 and the plurality of storage battery facilities 2a, 2b, 2c, a switching apparatus (power generation side switching apparatus) 9 provided between the renewable energy power generation facility and the grid side switching apparatus 8, and switching apparatuses (load side switching apparatuses) 9 provided between the first load 7a and the second load 7b, and the grid side switching apparatus 8.

The power system 1 according to the embodiment is in a state where the grid side switching apparatus 8 and the plurality of switching apparatuses 9 are all close during normal operation while power outage does not occur at the electric power grid 4. In this state, the power system 1 is interconnected to the electric power grid 4.

The power system 1 outputs "synthetic power" to a grid interconnection point with the electric power grid 4. The synthetic power is power obtained by synthesizing power generated by the renewable energy power generation facility 6 and storage battery power of the first storage battery facility 2a to the third storage battery facility 2c.

The power system 1 uses the power generated by the renewable energy power generation facility 6 and the storage battery power of the first storage battery facility 2a to the third storage battery facility 2c for various kinds of control (for example, grid stabilizing control and load reduction control) during interconnected operation. The multi-storage battery control apparatus 3 is constructed to individually control respective charge-discharge amounts of the first storage battery facility 2a to the third storage battery facility 2c.

While power outage occurs at the electric power grid 4, the power system 1 according to the embodiment is disconnected by the grid side switching apparatus 8 being open, and all of the plurality of switching apparatuses 9 are kept closed. In this state, the multi-storage battery control apparatus 3 individually controls respective charge-discharge amounts of the first storage battery facility 2a to the third storage battery facility 2c for backup control during power outage.

[Multi-Storage Battery Control Apparatus of Embodiment]

Figure 2:
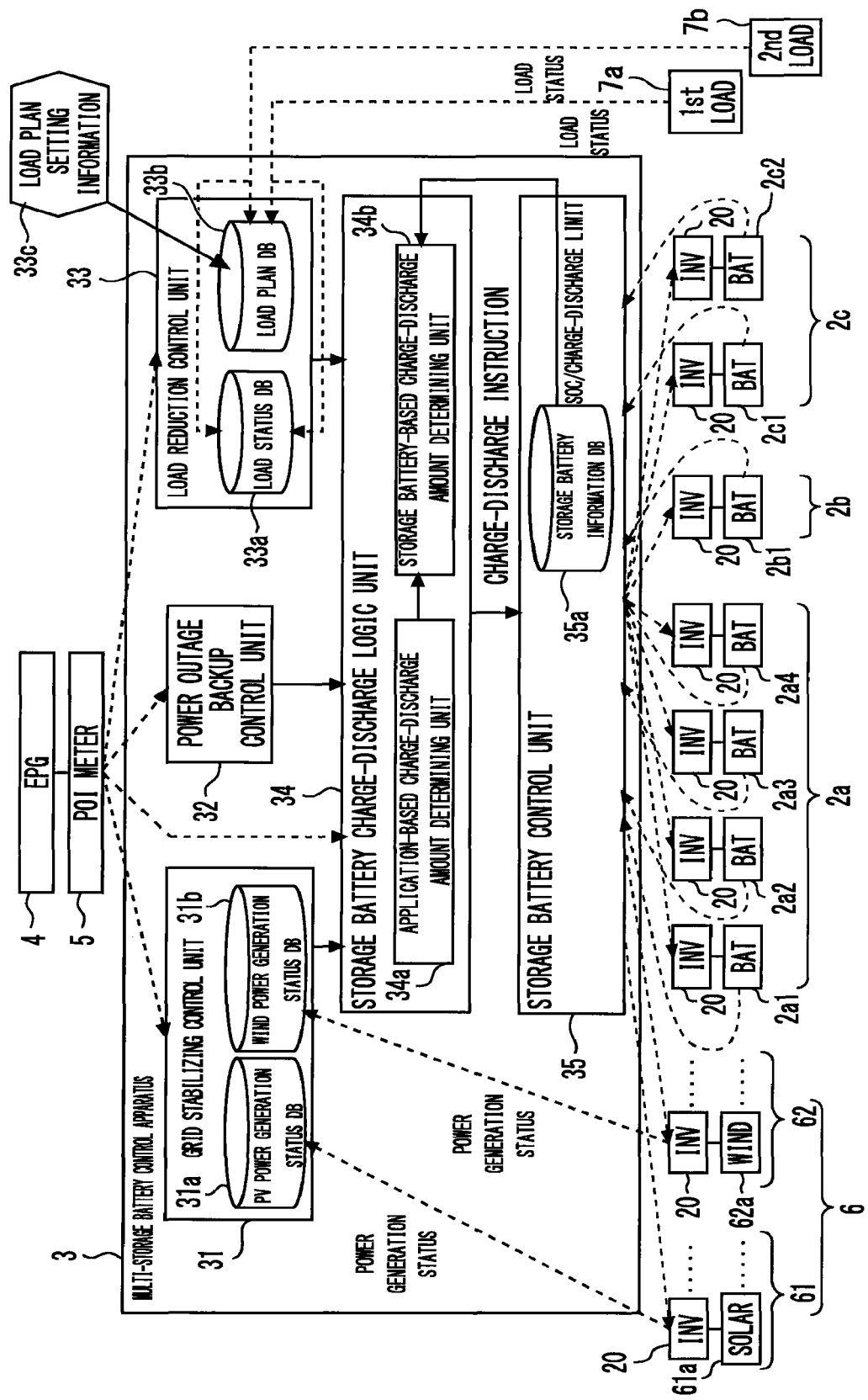
FIG. 2 is a view illustrating a configuration of the power system and a multi-storage battery control apparatus according to the embodiment of the present application.

FIG. 2 is a view illustrating a configuration of the power system 1 and the multi-storage battery control apparatus 3 according to the embodiment of the present application. The multi-storage battery control apparatus 3 according to the embodiment includes a grid stabilizing control unit 31, a power outage backup control unit 32, a load reduction control unit 33, a storage battery charge-discharge logic unit 34 and a storage battery control unit 35.

The multi-storage battery control apparatus 3 receives measurement data obtained by the POI meter 5 measuring a power parameter at a grid interconnection point with the electric power grid 4. This measurement data includes active power P, reactive power Q, frequency F, grid voltage V and power factor PF.

The grid stabilizing control unit 31 is constructed to execute active power change rate control, active power limit control, frequency control, voltage control, power factor control and reactive power control. The grid stabilizing control unit 31 transmits a storage battery charge-discharge target value for grid stabilizing control to the storage battery charge-discharge logic unit 34. The grid stabilizing control unit 31 only requires to be constructed to perform known grid stabilizing control.

The power outage backup control unit 32 is constructed to execute instantaneous power outage backup control and long-term power outage backup control. The power outage backup control unit 32 transmits a storage battery charge-discharge target value for power outage backup control to the storage battery charge-discharge logic unit 34. The power outage backup control unit 32 only requires to be constructed to perform known various kinds of power outage backup control.

The load reduction control unit 33 is constructed to execute peak-cut control and load schedule control. The load reduction control unit 33 transmits a storage battery charge-discharge target value for load reduction control to the storage battery charge-discharge logic unit 34. The load reduction control unit 33 only requires to be constructed to perform known various kinds of load reduction control.

The storage battery charge-discharge logic unit 34 includes an application-based charge-discharge amount determining unit 34a and a storage battery-based charge-discharge amount determining unit 34b. The application-based charge-discharge amount determining unit 34a is constructed to execute processing of calculating respective charge-discharge amounts respectively required for grid stabilizing control, power outage backup control and load reduction control. The storage battery-based charge-discharge amount determining unit 34b is constructed to execute processing of calculating respective charge-discharge amounts respectively required for instantaneous charge-discharge processing, medium-term charge-discharge processing and long-term charge-discharge processing.

The storage battery control unit 35 is constructed to execute SOC control, charge-discharge limit control and charge-discharge instruction output. The storage battery control unit 35 provides a P/Q command value to a plurality of power conversion apparatuses 20 included in the renewable energy power generation facility 6 and the plurality of storage battery facilities 2a, 2b, 2c. The P/Q command value is a command value including a set of an active power command value and a reactive power command value.

The multi-storage battery control apparatus 3 according to the embodiment includes various kinds of databases for performing power control appropriate for a real power generation status, a current load status, or the like.

Specifically, the grid stabilizing control unit 31 includes a photovoltaic power generation status database (PV generation status DB) 31a in which a current power generation amount is periodically updated, and a wind power generation status database 31b in which a current power generation amount is periodically updated. The grid stabilizing control unit 31 updates these databases by communicating with the plurality of power conversion apparatuses 20 included in the renewable energy power generation facility 6.

The load reduction control unit 33 includes a load status database 33a in which a current load power consumption amount is periodically updated, and a load plan database 33b. In the load plan database 33b, load plan setting information 33c is registered in advance. The load reduction control unit 33 updates these databases by communicating with each of the first load 7a and the second load 7b.

The storage battery control unit 35 includes a storage battery information database 35a. In the storage battery information database 35a, respective types of storage batteries currently included in individual storage battery facilities are stored. In the storage battery information database 35a, SOC of the respective storage batteries are stored, and the storage battery information database 35a is periodically updated with the latest SOC. Current storage battery information is transmitted from the storage battery information database 35a to the storage battery-based charge-discharge amount determining unit 34b. The storage battery information may include various kinds of information including, for example, current SOC of the respective storage batteries and charge-discharge limit values of the respective storage batteries. The storage battery information database 35a will be described in more detail later using FIG. 4.

Figures 3, 4:
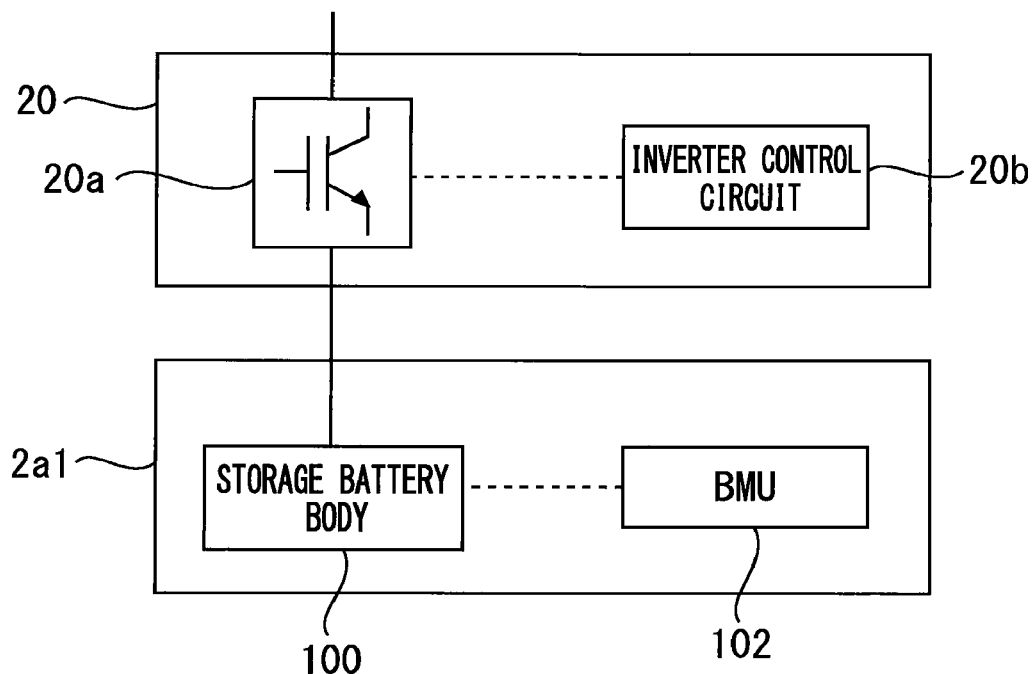
FIG. 3 is view illustrating a configuration of a power conversion apparatus and a storage battery facility provided at the power system according to the embodiment of the present application.
FIG. 4 is a view illustrating a storage battery information database as an example of a storage battery correspondence rule provided at the multi-storage battery control apparatus according to the embodiment of the present application.

FIG. 3 is a view illustrating a configuration of the power conversion apparatus 20 and the storage battery facility 2a provided in the power system 1 according to the embodiment of the present application. In FIG. 3, the first storage battery 2a1 of the first storage battery facility 2a and its peripheral components are illustrated as an example. The power conversion apparatus 20 includes an inverter circuit 20a which is a power conversion circuit and an inverter control circuit 20b which controls the inverter circuit. The first storage battery 2a1 includes a storage battery body 100, and a storage battery management unit (BMU) 102 which manages a state of this storage battery body 100. Configurations of other first storage batteries 2a2 to 2a4 in the first storage battery facility 2a, the second storage battery facility 2b and the third storage battery facility 2c are common except the storage battery body 100.

The charge-discharge control command is transmitted from the storage battery control unit 35 of the multi-storage battery control apparatus 3 to the plurality of power conversion apparatuses 20 included in the plurality of storage battery facilities 2a, 2b, 2c and the renewable energy power generation facility 6. The latest SOC is transmitted from the individual storage battery management units 102 to the storage battery control unit 35.

[Description of Storage Battery Correspondence Rule and Charge-Discharge Application]

FIG. 4 is a view illustrating a storage battery information database as an example of the storage battery correspondence rule provided at the multi-storage battery control apparatus 3 according to the embodiment of the present application. The storage battery information database 35a is constructed within a non-volatile memory of the multi-storage battery control apparatus 3. The storage battery information database 35a is electronic information which defines in advance correspondence relationship between a plurality of types of charge-discharge application and the first storage battery facility 2a to the third storage battery facility 2c.

Here, "a plurality of types of charge-discharge application" in the embodiment will be described. First charge-discharge application to third charge-discharge application are determined in advance by a system operator as application types different from each other. While the first charge-discharge application to the third charge-discharge application are normally determined in advance in a design phase or in an operation phase of the power system 1, types of charge-discharge application may be increased later.

More specifically, in the embodiment, the charge-discharge application is separated between "application for each type of power system control" and "application for each temporal element of charge-discharge". First, the "application for each type of power system control" is for what purpose the power system 1 uses charge-discharge power of the plurality of storage battery facilities 2a, 2b, 2c. In the embodiment, three types of application of application for grid stabilizing control, application for backup during power outage and application for load reduction are set.

Meanwhile, the "application for each temporal element of charge-discharge" is application which is separated while temporal elements when powers of the plurality of storage battery facilities 2a, 2b, 2c are charged/discharged are taken into account. For example, in the embodiment, the application is separated into three stages of application: instantaneous charge-discharge determined in advance (that is, application which requires a short-period and instantaneous and highly-responsive charge-discharge); long-term charge-discharge determined in advance (that is, application which requires long-term charge-discharge); and medium-term charge-discharge determined in advance (that is, application which requires a charge-discharge period at the midpoint of the instantaneous charge-discharge and the long-term charge-discharge).

The multi-storage battery control apparatus 3 according to the embodiment is constructed to use the first storage battery facility 2a for instantaneous charge-discharge application, use the second storage battery facility 2b for medium-term charge-discharge application and use the third storage battery facility 2c for long-term charge-discharge application. However, the temporal elements are not limited to three stages, and may be set at two stages which are less than three stages or may be set at four or more stages which are greater than three stages.

In the embodiment, the "application for each type of power system control" is associated with the "application for each temporal element of charge-discharge". Specifically, the application for grid stabilizing is associated with the instantaneous charge-discharge application, the application for backup during power outage is associated with the long-term charge-discharge application, and the application for load reduction is associated with the medium-term charge-discharge application. However, such association of application is merely an example, and various modifications are possible for a way to determine application.

As illustrated in FIG. 4, in the embodiment, as an example, in the storage battery information database 35a, correspondence relationship between a plurality of types of charge-discharge application and the plurality of storage battery facilities 2a, 2b, 2c is set and registered in advance. By this storage battery information database 35a being written in a non-volatile memory within the multi-storage battery control apparatus 3, it becomes easy to perform correction later.

However, as a modified example, a form of the "correspondence rule" is not limited to electronic information stored in a non-volatile memory so as to be able to be rewritten, and the "correspondence rule" may be provided in other forms. For example, the correspondence rule may be provided in a form such as a logic circuit, or the correspondence rule may be provided by an apparatus (such as a manual switch) which is manually operated.

[Configuration and Operation of Storage Battery Charge-Discharge Logic Unit]

As illustrated in FIG. 2, the storage battery charge-discharge logic unit 34 includes the application-based charge-discharge amount determining unit 34a and the storage battery-based charge-discharge amount determining unit 34b. The storage battery charge-discharge logic unit 34 respectively individually calculates a first charge-discharge amount for application for grid stabilizing control which is the first charge-discharge application, a second charge-discharge amount for application for load reduction control which is the second charge-discharge application, and a third charge-discharge amount for application for backup power supply during power outage which is the third charge-discharge application.

The multi-storage battery control apparatus 3 acquires a charge-discharge amount for normal operation application while power outage does not occur at the electric power grid 4. The charge-discharge amount for normal operation application in the embodiment is application for grid stabilizing and application for load reduction. The multi-storage battery control apparatus 3 acquires the first charge-discharge amount for grid stabilizing control on the basis of a signal transmitted from the grid stabilizing control unit 31. The multi-storage battery control apparatus 3 acquires the second charge-discharge amount for load reduction control on the basis of a signal transmitted from the load reduction control unit 33.

Meanwhile, the multi-storage battery control apparatus 3 acquires the third charge-discharge amount for application for backup power supply during power outage while power outage occurs at the electric power grid 4 on the basis of a signal transmitted from the power outage backup control unit 32.

In the embodiment, a power outage detection signal indicating whether or not power outage occurs at the electric power grid 4 which is interconnected to the power system 1 is acquired. The power outage detection signal includes at least two types of states including "power outage (that is, abnormal time)" and "no power outage (that is, normal operation)". In the embodiment, it is assumed that, in a case where power outage does not occur at the electric power grid 4 which is interconnected to the power system 1, the application for grid stabilizing and the application for load reduction are selected. In the embodiment, it is assumed that, in a case where power outage occurs at the electric power grid 4 which is interconnected to the power system 1, application during power outage is selected.

In a case where power outage does not occur at the electric power grid 4, the multi-storage battery control apparatus 3 may control charge-discharge of the first storage battery facility 2a and the third storage battery facility 2c on the basis of the first charge-discharge amount and the third charge-discharge amount and may execute processing of setting the charge-discharge amount of the second storage battery facility 2b at 0. In a case where power outage occurs at the electric power grid 4, the multi-storage battery control apparatus 3 may set the charge-discharge amounts of the first storage battery facility 2a and the third storage battery facility 2c at 0 and may execute processing of controlling charge-discharge of the second storage battery facility 2b on the basis of the second charge-discharge amount.

Note that, as an example, such selection control upon power outage can be realized through a control routine in FIG. 20 which will be described later.

[Configuration and Operation of Storage Battery Control Unit]

The storage battery control unit 35 is constructed to control charge-discharge of the first storage battery facility 2a on the basis of the first charge-discharge amount, control charge-discharge of the second storage battery facility 2b on the basis of the second charge-discharge amount, and control charge-discharge of the third storage battery facility 2c on the basis of the third charge-discharge amount, in accordance with the storage battery charge-discharge instruction from the storage battery charge-discharge logic unit 34.

The storage battery control unit 35 includes processing of calculating respective first individual charge-discharge amounts of the plurality of first storage batteries 2a1 to 2a4 included in the first storage battery facility 2a by dividing the first charge-discharge amount by a first division ratio determined in advance. The storage battery control unit 35 executes processing of controlling charge-discharge of the respective plurality of first storage batteries 2a1 to 2a4 in accordance with the first individual charge-discharge amounts.

Note that calculation and control of the first individual charge-discharge amounts for the first storage battery facility 2a can be realized through a control routine in FIG. 27 which will be described later as an example. H_BAT_P-Com_ST in the control routine in FIG. 27 corresponds to the first individual charge-discharge amounts for the first storage battery facility 2a.

The storage battery control unit 35 includes processing of calculating respective second individual charge-discharge amounts of the plurality of third storage batteries 2c1 and 2c2 included in the third storage battery facility 2c by dividing the third charge-discharge amount by a second division ratio determined in advance. The storage battery control unit 35 executes processing of controlling charge-discharge of the respective plurality of storage batteries 2c1 and 2c2 in accordance with the second individual charge-discharge amounts.

Note that calculation and control of the second individual charge-discharge amounts for the third storage battery facility 2c can be realized through a control routine in FIG. 29 which will be described later as an example. BKUP_BAT_ST in the control routine in FIG. 29 corresponds to the second individual charge-discharge amounts for the third storage battery facility 2c.

The above-described first division ratio and second division ratio can be determined in various ways. As an example, the above-described first division ratio and second division ration may be determined so as to realize equal division. According to equal division, the provided charge-discharge amount is equally divided in accordance with the number of storage batteries.

Further, the above-described first division ratio and second division ratio may be determined so as to realize unequal division such as, for example, proportional division. "Proportional division" is also referred to as "apportionment". "Apportionment" refers to calculating a ratio on the basis of specific quantity (such as, for example, storage battery rated capacity) and allocating amounts (here, charge-discharge amounts) in accordance with the ratio. According to proportional division (apportionment), it is possible to proportionally divide the charge-discharge amount in accordance with specific storage battery information. The specific quantity which becomes a reference may be, for example, storage battery rated capacity or other specific storage battery information.

Further, the first division ratio and the second division ratio do not necessarily have to be a fixed value and may be dynamic proportional division. The dynamic proportional division may be, for example, division such that higher charge-discharge amounts are preferentially set for storage batteries with higher SOC among the plurality of storage batteries.

[Simulation of Virtual Single Storage Battery]

A storage battery facility including a plurality of different types of storage batteries will be also referred to as a "different type mixed storage battery facility" for convenience sake. In the embodiment, among the plurality of storage battery facilities 2a, 2b, 2c, the first storage battery facility 2a and the third storage battery facility 2c are the "different type mixed storage battery facility".

The multi-storage battery control apparatus 3 according to the embodiment includes control processing for "simulation of a virtual single storage battery" to simulate such a different type mixed storage battery facility at a single storage battery. Specifically, the multi-storage battery control apparatus 3 acquires respective pieces of storage battery information of a plurality of storage batteries included in the different type mixed storage battery facility. The storage battery information includes one or more pieces of information selected from a group including rated capacity (RC), a current SOC value, an SOC lower limit value, an SOC upper limit value, a charge limit value, a discharge limit value, and a startup power amount of the storage battery for long-term charge-discharge. Preferably, the storage battery information may include at least a current SOC value.

Then, the multi-storage battery control apparatus 3 computes combined storage battery information obtained by combining respective pieces of the acquired storage battery information into one. In a case where the plurality of pieces of storage battery information are combined, information of the same type is combined. For example, it is assumed that, in a case where SOC and rated capacity are included in respective pieces of the storage battery information, a plurality of SOC are combined, and a plurality of pieces of rated capacity are combined.

The combined storage battery information can be obtained using various computation methods. For example, an arithmetic mean value obtained by dividing a total value of a plurality of pieces of storage battery information by the number of storage batteries may be set as the combined storage battery information. Alternatively, a weighted mean value calculated after weight determined in advance being applied to a plurality of pieces of storage battery information may be set as the combined storage battery information.

Note that such processing of computing the combined storage battery information of a virtual single storage battery can be realized through processing from step S223 to S227 in a control routine in FIG. 21 which will be described later as an example.

The multi-storage battery control apparatus 3 may include storage battery diagnosis processing for diagnosing a state of the different type mixed storage battery facility on the basis of the combined storage battery information. The storage battery diagnosis processing may be processing of determining whether a value of the combined storage battery information is greater or smaller than a threshold determined in advance or may be processing of determining whether the value of the combined storage battery information falls within a predetermined range determined in advance.

In a design and operation phase of the power system 1, various specifications and operation conditions of the different type mixed storage battery facility must be assumed in advance. The multi-storage battery control apparatus 3 can detect occurrence of a situation where the assumed specifications or the assumed operation conditions are not satisfied as the different type mixed storage battery facility even if the facility is normal in units of individual storage batteries.

There are various methods for such diagnosis of a virtual single storage battery. For example, whether the charge-discharge amount of the virtual single storage battery is deficient may be determined. This determination as to deficiency of the charge-discharge amount may be realized through processing from step S280 to S281 in a control routine in FIG. 27 which will be described later as an example.

As another example, the multi-storage battery control apparatus 3 may diagnose as to whether or not a charge-discharge command for the virtual single storage battery falls within a predetermined range on the basis of the combined storage battery information and may perform charge-discharge limit control for imposing a limitation on the charge-discharge amount of the virtual single storage battery as necessary. This charge-discharge limit control may be realized through, for example, processing from step S235 to S238 in the control routine in FIG. 22 which will be described later as an example. The charge-discharge limit control may be realized through processing from step S251 to S252 in the control routine in FIG. 24 which will be described later as an example. The charge-discharge limit control may be realized through processing from step S272 to S273 in the control routine in FIG. 26 which will be described later as an example.

Note that, as a modified example, a typical numerical value may be obtained from a maximum value, a minimum value, a mode value or a median value of a plurality of pieces of storage battery information. A state or specifications of the different type mixed storage battery facility may be evaluated using this typical storage battery information.

While three storage battery facilities 2a, 2b, 2c are provided in the embodiment, as a modified example, two storage battery facilities or four or more storage battery facilities may be provided. Further, it is also possible to reduce the number of storage batteries of the first storage battery facility 2a and constitute the first storage battery facility 2a with one storage battery. Still further, it is also possible to reduce the number of storage batteries of the third storage battery facility 2c and constitute the third storage battery facility 2c with one storage battery. Further, while, in the embodiment, types of the provided storage batteries are all different, a plurality of storage batteries of the same type may be provided at one storage battery facility.

As a modified example, the renewable energy power generation facility 6 may be omitted. Alternatively, a modified example in which one of the photovoltaic power generation facility 61 and the wind power generation facility 62 is omitted may be provided.

The multi-storage battery control apparatus 3 according to the embodiment is constructed to control charge-discharge of storage batteries belonging to a target storage battery facility which is a target for specific charge-discharge application among a plurality of storage battery facilities 2a, 2b, 2c in accordance with the storage battery information database 35a in a case where the specific charge-discharge application among a plurality of types of charge-discharge application is designated.

Note that the storage battery information database 35a is not limited to that illustrated in FIG. 4. The storage battery information database 35a may be a database in which the plurality of storage battery facilities 2a, 2b, 2c are associated with application during power outage and application at a normal time. Further, the "application for each type of power system control" does not have to be associated with the "application for each temporal element of charge-discharge". The storage battery information database 35a may be a database in which the plurality of storage battery facilities 2a, 2b, 2c are associated with two or more types of charge-discharge application among the application for grid stabilizing, the application for backup during power outage and the application for load reduction. The storage battery information database 35a may be a database in which the plurality of storage battery facilities 2a, 2b, 2c are associated with two or more types of charge-discharge application among the instantaneous charge-discharge application, the medium-term charge-discharge application and the long-term charge-discharge application.

As a modified example, the control operation of simulating the "virtual single storage battery" described above does not have to be performed. In this case, for example, state determination or charge-discharge control may be sequentially or selectively performed on one or two at one time among a plurality of storage batteries.

Note that it is also possible to provide various modified examples by omitting one or more elements from a plurality of elements (that is, a plurality of components, a plurality of pieces of information and a plurality of pieces of control content) included in the embodiment.

For example, "simulation of the virtual single storage battery" in the embodiment and various kinds of modified examples regarding this may be implemented independently. In this case, the multi-storage battery control apparatuses of other power systems according to the present application may be constructed to execute processing of acquiring respective SOC of the plurality of storage batteries included in the storage battery facility and computing combined SOC obtained by combining the acquired respective SOC into one, and processing of diagnosing a state of the storage battery facility on the basis of the combined SOC. In such other power systems, a configuration regarding "selective use of a storage battery facility in accordance with charge-discharge application" in the embodiment may be omitted.

Example 1

An example of specific design conditions, the control routine, or the like, of the power system 1 in the embodiment will be described below as an example.

FIG. 5 to FIG. 11 are views illustrating various kinds of data stored in the multi-storage battery control apparatus 3 in the power system 1 according to the example of the present application. The various kinds of data in FIG. 5 to FIG. 11 include setting data and a current value. The setting data is, for example, a reference value set in advance and held in a system design phase or a system introduction phase. The current value is a value which is updated as needed with a period determined in advance during system operation. The current value is data indicating a current status of a target object, and also is an actual value indicating past and current operation statuses of the target object.

FIG. 5 is an example of the storage battery information database 35a, and this is an example which embodies the storage battery information database 35a illustrated in FIG. 4 in more detail. Respective storage batteries having battery numbers No. 1 to No. 4 allocated as batteries for "instantaneous charge-discharge" belong to the "first storage battery facility 2*a*" described above. That is, the respective batteries having the battery numbers No. 1 to No. 4 respectively indicate the first storage batteries 2*a*1 to 2*a*4. In a similar manner, a storage battery having a battery number No. 5 allocated as a battery for "medium-term charge-discharge" corresponds to the second storage battery 2*b*1 belonging to the "second storage battery facility 2*c*" described above. In a similar manner, respective storage batteries having battery numbers No. 6 to No. 7 allocated as batteries for "long-term charge-discharge" correspond to the third storage batteries 2*c*1 and 2*c*2 belonging to the "third storage battery facility 2*c*" described above.

FIG. 6 is an example of a photovoltaic power generation status database 31*a*. FIG. 7 is an example of a wind power generation status database 31*b*. In the embodiment, as an example, seven power conversion apparatuses 20 for photovoltaic power generation are provided, and name of "PV-PCS-1" to "PV-PCS-7" is provided as name for identification. In the embodiment, as an example, seven power conversion apparatuses 20 for wind power generation are provided, and name of "MV-PCS-1" to "MV-PCS-7" is provided as name for identification. "PCS" is abbreviated name of Power Conditioning System.

FIG. 8 is an example of a load status database 33*a*. FIG. 9 to FIG. 11 are an example of a load plan database 33*b*. FIG. 9 defines a monthly plan, FIG. 10 defines a weekly plan, and FIG. 11 defines an hourly plan. As illustrated in FIG. 9 to FIG. 11, there is a case where a value of a load result is greater than a value of a load plan or inversely, there is a case where the value of the load result is smaller than the value of the load plan.

FIG. 12 to FIG. 30 are flowcharts of the control routines to be executed in the power system 1 according to the example of the present application. The multi-storage battery control apparatus 3 executes the respective routines in FIG. 12 to FIG. 30.

Figure 12:
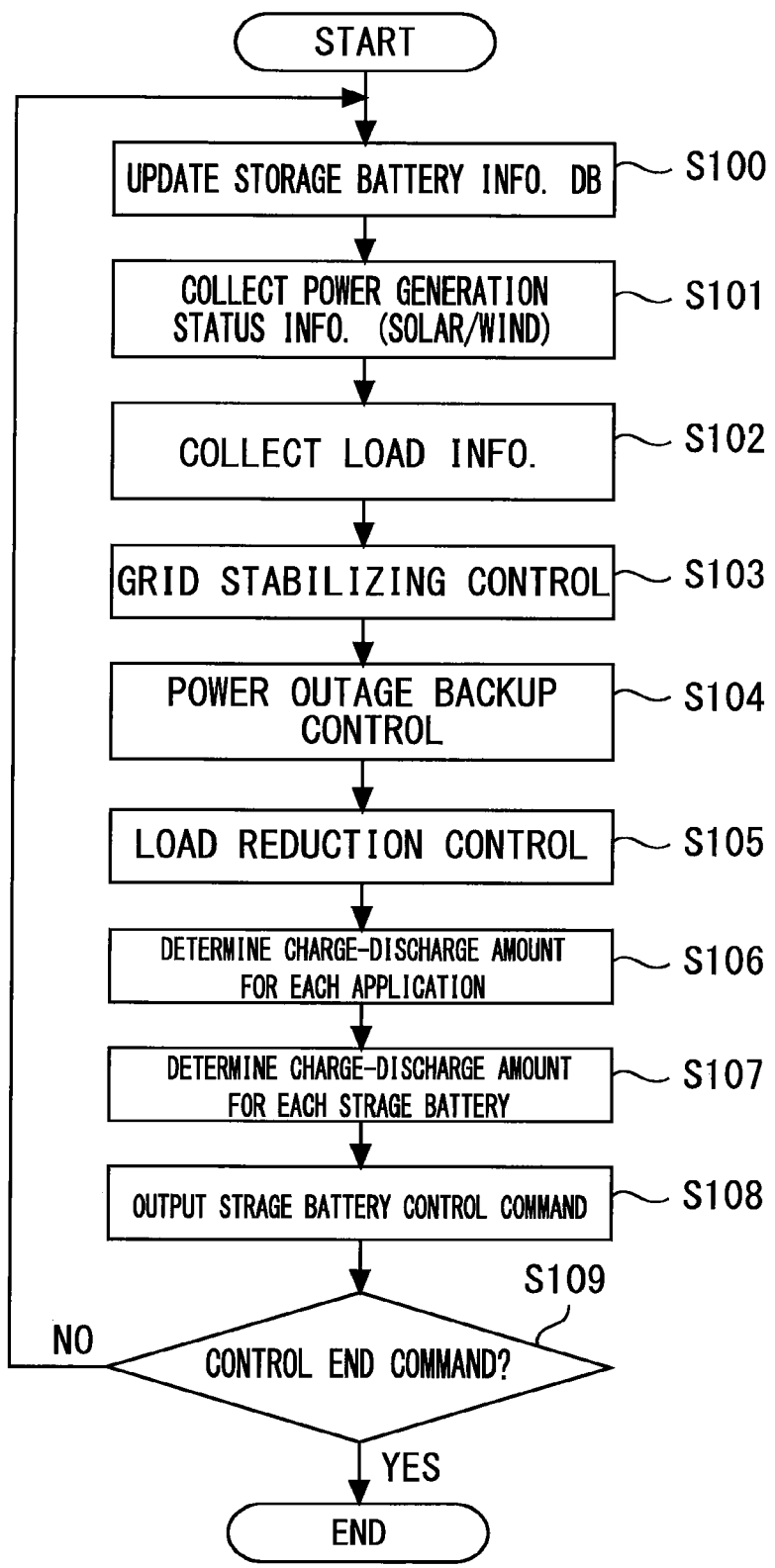
FIG. 12 is a flowchart of a control routine to be executed in the power system according to the example of the present application.

The routine in FIG. 12 indicates a whole image of the control routine to be executed by the multi-storage battery control apparatus 3, which is separated into steps. So to speak, FIG. 12 is a main routine, and FIG. 13 to FIG. 30 are sub-routines which are called in the respective steps in FIG. 12.

Figure 13:
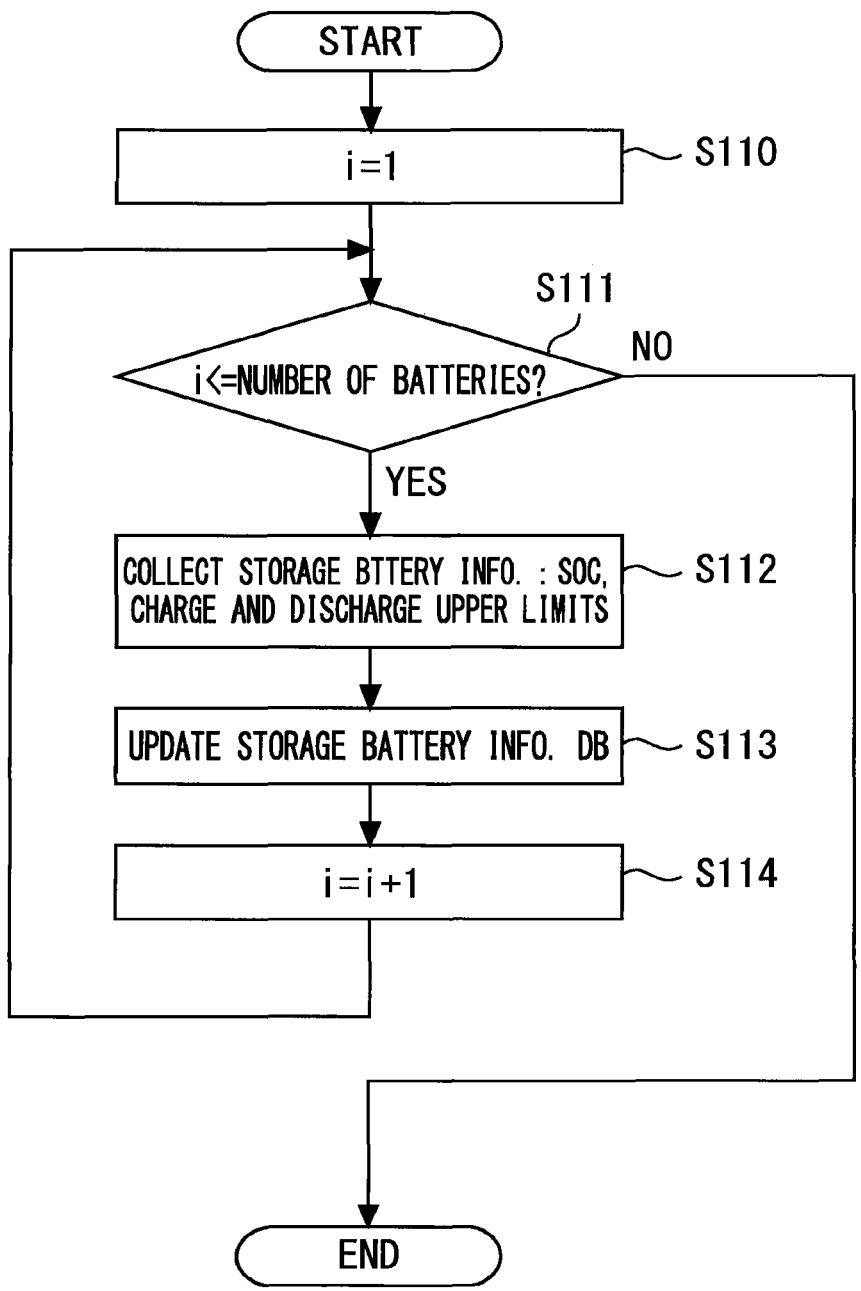
FIG. 13 is a flowchart of the control routine to be executed in the power system according to the example of the present application.

In the routine in FIG. 12, first, the storage battery information database 35*a* is updated (step S100). In step S100, specifically, the routine illustrated in FIG. 13 is executed. Processing in this step may be executed mainly by the storage battery control unit 35, or may be executed in cooperation with a plurality of control units, or the like, as necessary.

Figure 14:
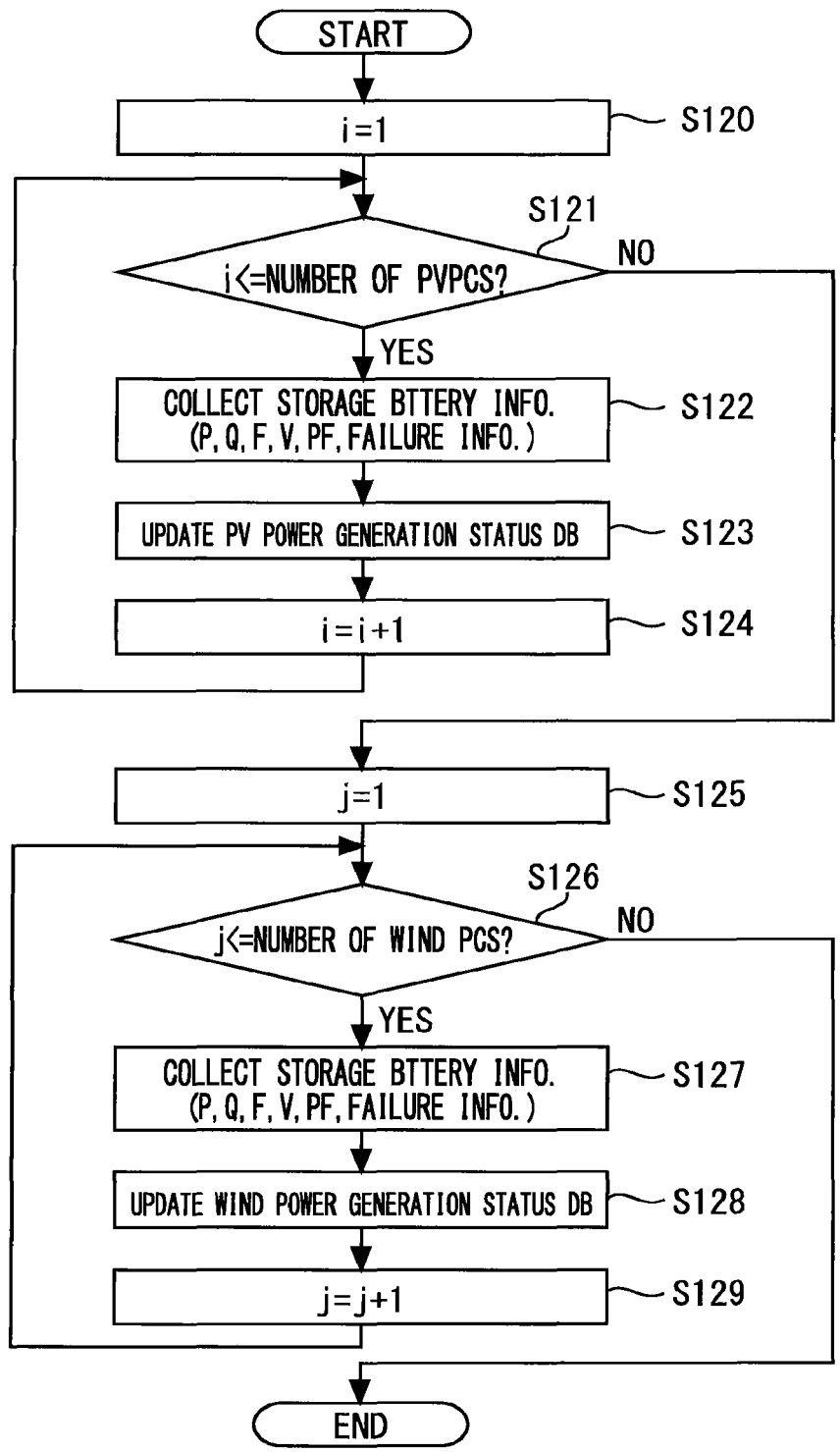
FIG. 14 is a flowchart of the control routine to be executed in the power system according to the example of the present application.

Then, information regarding respective power generation statuses of photovoltaic power generation and wind power generation is collected (step S101). In step S101, specifically, the routine illustrated in FIG. 14 is executed. Processing in this step may be executed mainly by the grid stabilizing control unit 31 or may be executed in cooperation with a plurality of control units, or the like, as necessary.

Figure 15:
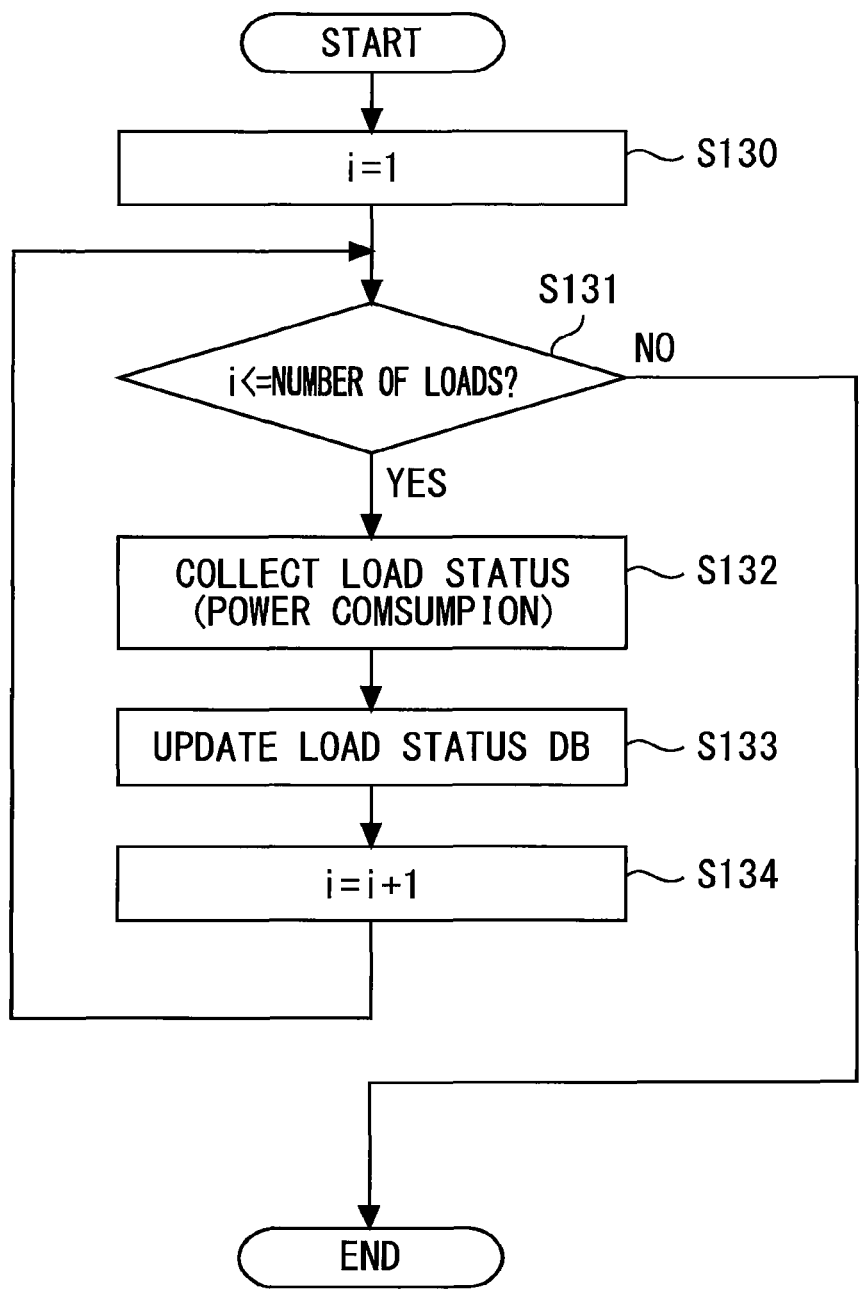
FIG. 15 is a flowchart of the control routine to be executed in the power system according to the example of the present application.

Then, information of load is collected (step S102). In step S102, specifically, the routine illustrated in FIG. 15 is executed. Processing in this step may be executed mainly by the load reduction control unit 33.

Figure 16:
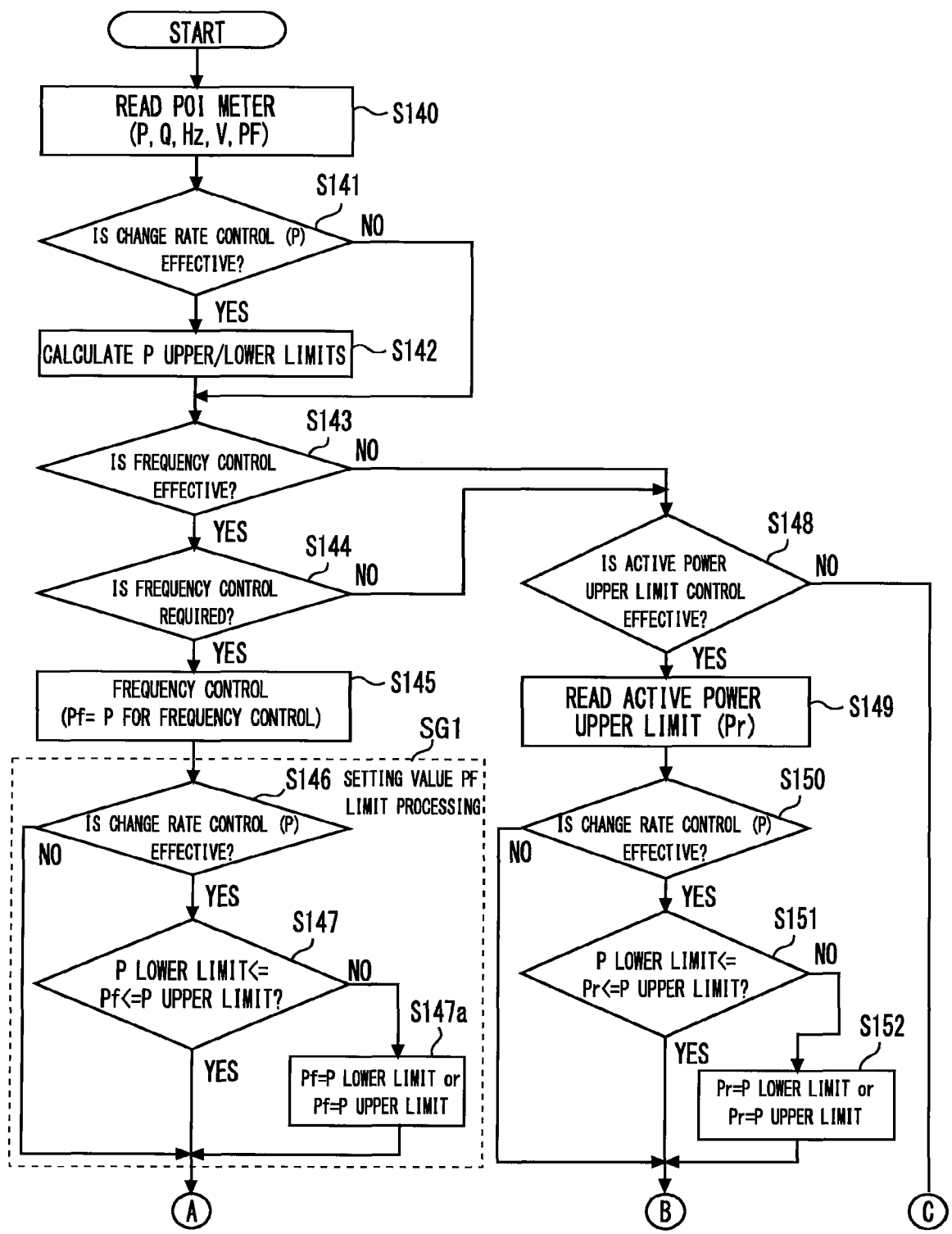
FIG. 16 is a flowchart of the control routine to be executed in the power system according to the example of the present application.
Figure 17:
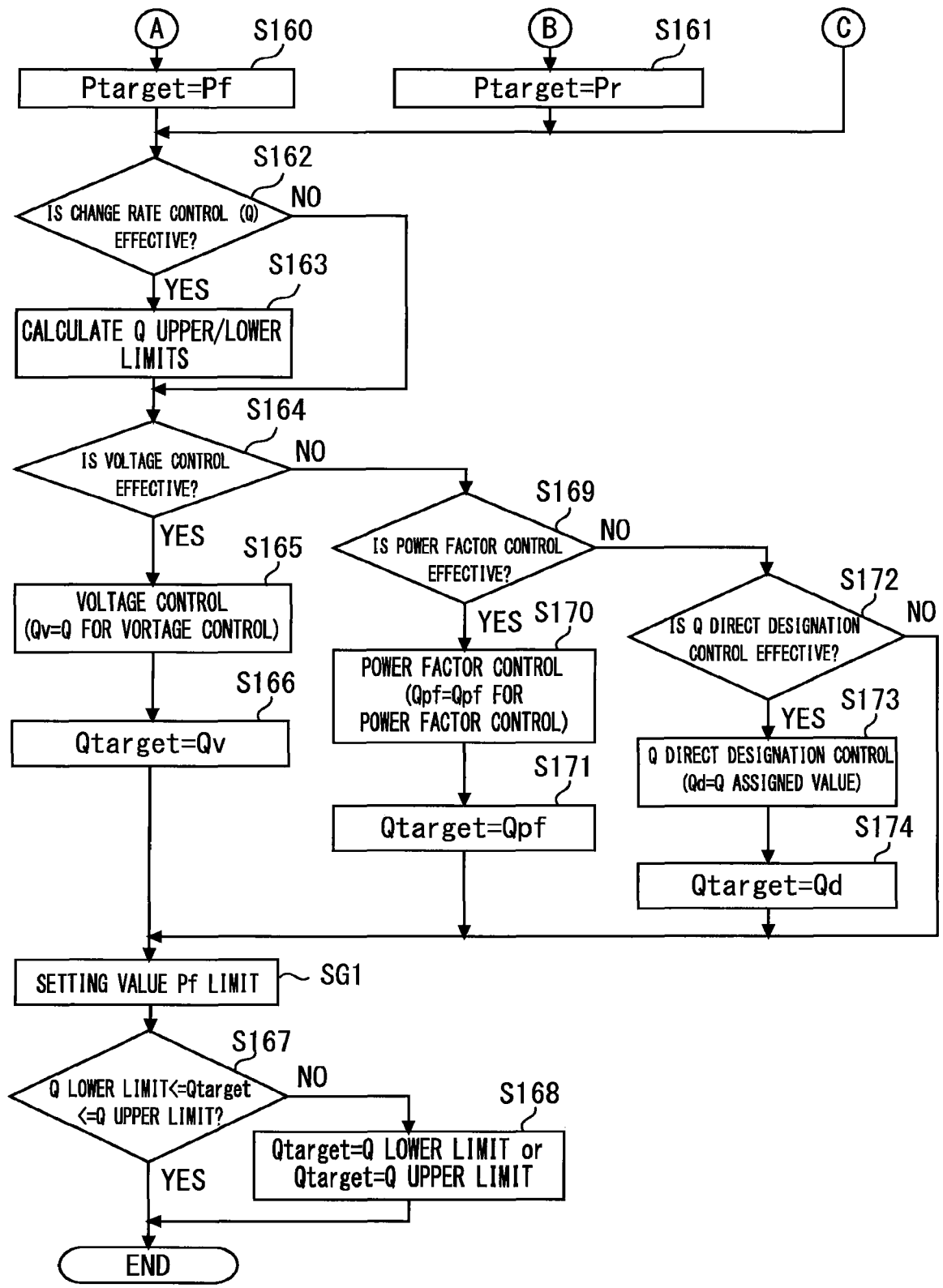
FIG. 17 is a flowchart of the control routine to be executed in the power system according to the example of the present application.

Then, computation processing regarding grid stabilizing control is executed (step S103). In step S103, specifically, the routine illustrated in FIG. 16 and FIG. 17 is executed. Processing in this step may be executed mainly by the grid stabilizing control unit 31 or may be executed in cooperation with a plurality of control units, or the like, as necessary.

Figure 18:
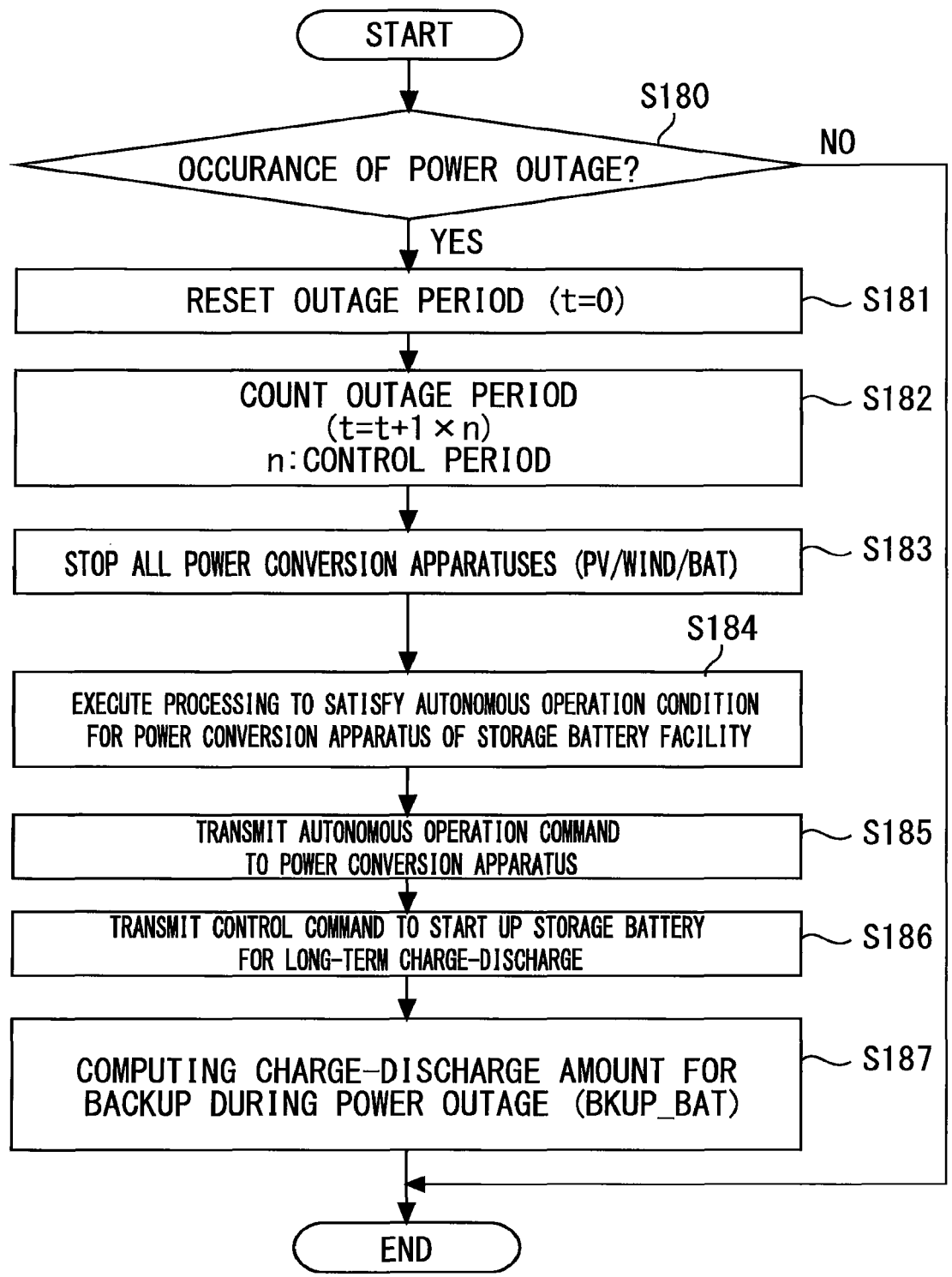
FIG. 18 is a flowchart of the control routine to be executed in the power system according to the example of the present application.

Then, computation processing regarding power outage backup control is executed (step S104). In step S104, specifically, the routine illustrated in FIG. 18 is executed. Processing in this step may be executed mainly by the power outage backup control unit 32 or may be executed in cooperation with a plurality of control units, or the like, as necessary.

Figure 19:
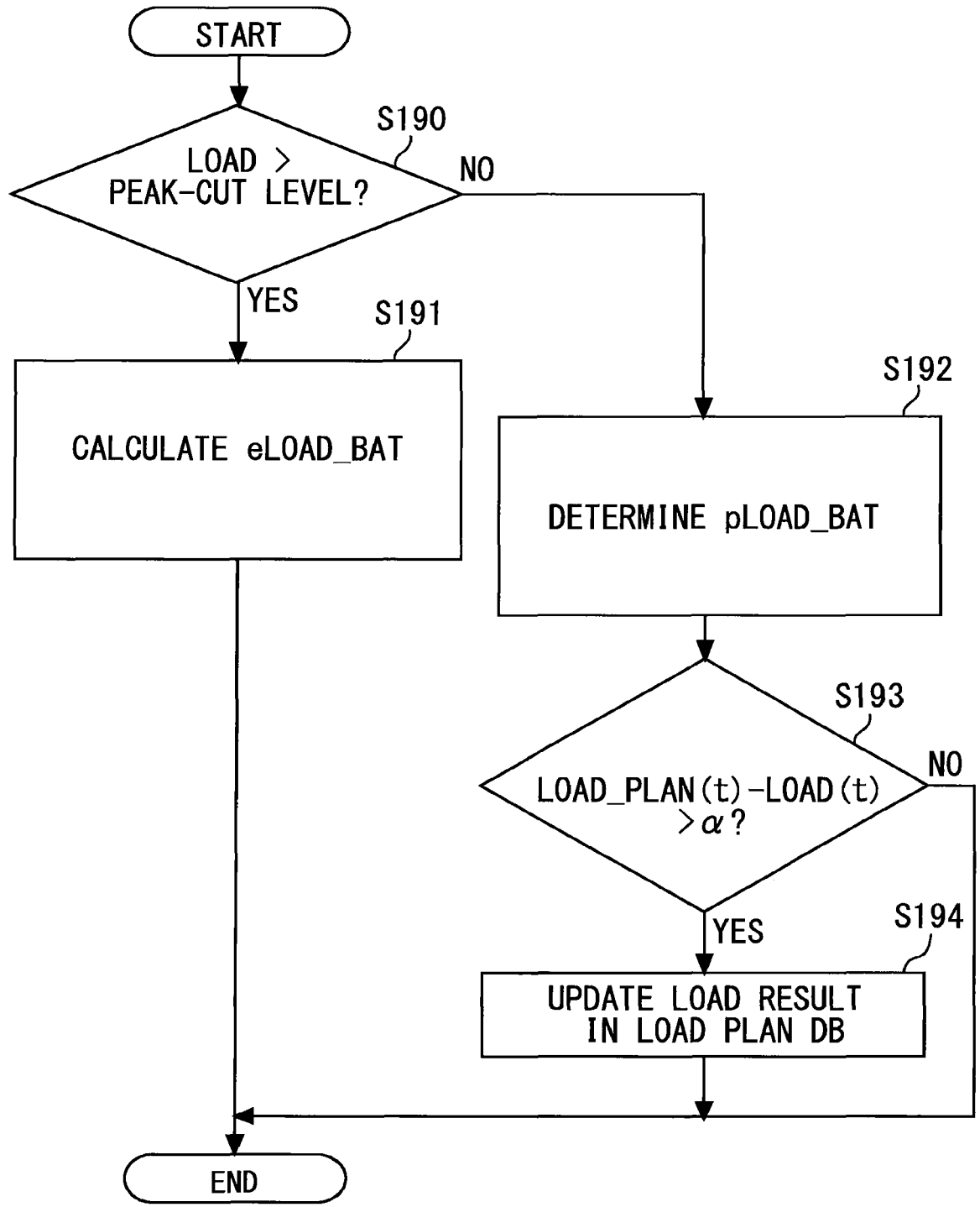
FIG. 19 is a flowchart of the control routine to be executed in the power system according to the example of the present application.

Then, computation processing regarding load reduction control is executed (step S105). In step S105, specifically, the routine illustrated in FIG. 19 is executed. Processing in this step may be executed mainly by the load reduction control unit 33 or may be executed in cooperation with a plurality of control units, or the like, as necessary.

Then, processing for determining a charge-discharge amount for each type of application (step S106) is executed. In step S106, specifically, the routine illustrated in FIG. 20 is executed. Processing in this step may be executed mainly by the application-based charge-discharge amount determining unit 34*a* or may be executed in cooperation with a plurality of control units, or the like, as necessary.

Then, processing for determining a charge-discharge amount for each storage battery (step S107) is executed. In step S107, some of the routines illustrated in FIG. 21 to FIG. 26 are executed in accordance with processing content of the routine in FIG. 20. Processing in this step may be executed mainly by the storage battery-based charge-discharge amount determining unit 34*b* or may be executed in cooperation with a plurality of control units, or the like, as necessary.

Then, processing of outputting a storage battery control command (step S108) is executed. In step S108, specifically, the routine illustrated in FIG. 27 to FIG. 30 is executed. Processing in this step may be executed mainly by the storage battery control unit 35 or may be executed in cooperation with a plurality of control units, or the like, as necessary.

At last, whether or not a control end command is output is determined (step S109). As long as the control end command is not output, processing from step S100 to S109 is repeatedly performed, updating of the database with the latest value and various kinds of control computation processing are continued, and the power system 1 continues to operate. If the control end command is issued, the main routine in FIG. 12 ends.

FIG. 13 is processing for updating the storage battery information database 35*a*. In the routine in FIG. 13, first, 1 is assigned to i (step S110). Then, whether or not i is equal to or less than the number of storage batteries is determined (step S111). The number of storage batteries means a total number of storage batteries included in the power system 1, and, in the present example, as illustrated in FIG. 5, the number of storage batteries is 7.

If i is equal to or less than the number of storage batteries, then, processing of collecting the storage battery information is performed (step S112). In this step, a storage battery having a storage battery number corresponding to a value of i at the present moment is set as a target storage battery. For example, in a case where i=1, an EDLC that is, the first storage battery 2*a*1 is set as the target storage battery in accordance with the battery number in FIG. 5. The multi-storage battery control apparatus 3 acquires SOC, a charge limit value and a discharge limit value of the target storage battery from storage battery management units 102 respectively included in the plurality of storage battery facilities 2*a*, 2*b*, 2*c*.

Then, the storage battery information database 35*a* is updated with the storage battery information acquired in step S112 (step S113). Then, i is incremented, and the processing returns to step S111. Subsequently, when i is incremented to 8 by the processing from step S111 to step S114 being repeated, the processing breaks a loop in step S111, and the routine in FIG. 13 ends.

FIG. 14 is processing for collecting information regarding the photovoltaic power generation status and the wind power generation status. In the routine in FIG. 14, first, 1 is assigned to i (step S120). Then, whether or not i is equal to or less than the number of PVPCS is determined (step S121). The number of PVPCS is the number of power conversion apparatuses 20 included in the photovoltaic power generation facility 61.

As illustrated in FIG. 6, in the present example, the number of PVPCS is "7". Note that the photovoltaic power generation facility to which an identification number corresponding to a current value of the identifier i is provided will be also referred to as an i-th photovoltaic power generation facility.

Then, the multi-storage battery control apparatus 3 acquires a power generation status of the photovoltaic power generation facility 61 by communicating with the power conversion apparatus 20 included in the i-th photovoltaic power generation facility (step S122). For example, if i=1, as illustrated in FIG. 6, a PV-PCS-1 to which a number of 1 is provided is the power conversion apparatus 20 which is a communication target. In this step, as the power generation status, active power P, reactive power Q, a frequency F, a voltage V, a power factor PF, and failure information regarding the photovoltaic power generation facility 61 are acquired.

Then, the photovoltaic power generation status database 31a is updated on the basis of the information acquired in step S122 (step S123). Then, the processing from step S121 to S124 is repeated while a value of i is incremented. Subsequently, when i becomes 8, the processing breaks a loop in step S121.

Then, 1 is assigned to j (step S125). Then, whether or not j is equal to or less than the number of wind power PCS is determined (step S126). The number of wind power PCS is the number of power conversion apparatuses 20 included in the wind power generation facility 62.

As illustrated in FIG. 7, in the present example, the number of wind power PCS is "7". Note that the wind power generation facility to which an identification number corresponding to a current value of the identifier j is provided is also referred to as a j-th wind power generation facility.

Then, the multi-storage battery control apparatus 3 acquires a power generation status of the wind power generation facility 62 by communicating with the power conversion apparatus 20 included in the j-th wind power generation facility (step S127). For example, if j=1, as illustrated in FIG. 7, an MV-PCS-1 to which a number of 1 is provided is the power conversion apparatus 20 which is a communication target. In this step, as the power generation status, active power P, reactive power Q, a frequency F, a voltage V, a power factor PF and failure information regarding the wind power generation facility 62 are acquired.

Then, the wind power generation status database 31b is updated on the basis of the information acquired in step S127 (step S128). Then, the processing from step S126 to S129 is repeated while a value of j is incremented. Subsequently, when j becomes 8, the processing breaks a loop in step S126.

FIG. 15 is processing for collecting load information. In the routine in FIG. 15, 1 is assigned to i (step S130). Then, whether or not i is equal to or less than the number of loads is determined (step S131). The number of loads is the number of loads included in the power system 1. As illustrated in FIG. 8, in the present example, the number of loads is "2".

Then, the multi-storage battery control apparatus 3 acquires a load status of a load by communicating with the load to which an identification number corresponding to current i is provided (step S132). For example, if i=1, as illustrated in FIG. 8, the first load 7a to which a number of 1 is provided becomes a communication target. In this step, load power consumption is acquired as the load status.

Then, the load status database 33a is updated on the basis of the information acquired in step S132 (step S133). Then, the processing from step S131 to S134 is repeated while a value of i is incremented. Subsequently, when i becomes 3, the processing breaks a loop in step S131.

FIG. 16 and FIG. 17 are computation processing for performing grid stabilizing control. In the routine in FIG. 16, first, a measurement value of the POI meter 5 which is a power meter provided at a grid interconnection point is read (step S140). The measurement value is active power P, reactive power Q, a frequency Hz, a voltage V and a power factor PF.

Then, whether or not change rate control of the active power P is effective is determined (step S141). If the change rate control of the active power P is effective, a P upper limit value and a P lower limit value are respectively calculated (step S142), while, if the change rate control is not effective, the processing in step S142 is skipped, and the processing proceeds to step S143.

Then, whether or not frequency control is effective is determined (step S143). In a case where it is determined that frequency control is effective, whether or not frequency control is required is determined (step S144). In a case where it is determined that frequency control is required, frequency control is performed (step S145). In the frequency control, a setting value Pf for frequency control is assigned as a value of the active power P for frequency control. The frequency control setting value Pf is also a setting value of the active power P required for performing frequency control. The frequency control setting value Pf is set to suppress the active power P in a case where a frequency f is high, and set to reduce a degree of suppression of the active power P in a case where the frequency f is low.

Then, whether or not change rate control of the active power P is effective is determined (step S146). In a case where the change rate control is not effective, the processing in step S147 and step S147a is skipped, and the processing proceeds next. The subsequent processing is restarted from a position of a reference numeral A in FIG. 17.

In a case where the change rate control is effective, whether the above-described setting value Pf falls within a predetermined range is determined (step S147). Specifically, whether or not a condition of the following expression (1) is satisfied is determined.

$$P \text{ lower limit value} \leq Pf \leq P \text{ upper limit value} \tag{1}$$

In a case where the condition of the expression (1) is satisfied, the processing in step S147a is skipped, and the processing proceeds next. In a case where the condition of the expression (1) is not satisfied, a value of the setting value Pf is set at a value of one of the P lower limit value and the P upper limit value (step S147a). By this means, the value of the setting value Pf is limited within a certain range. The subsequent processing is restarted from a position of a reference numeral A in FIG. 17. Note that a reference numeral SG1 is assigned to a group of a series of step including step S146, step S147 and step S147a, and the group is also referred to as "setting value Pf limit processing".

Meanwhile, in a case where a determination result in step S143 or step S144 is negative (n), the processing proceeds to step S148. In step S148, whether or not active power upper limit value control is effective is determined. In a case where the active power upper limit value control is effective, an active power upper limit value (Pr) is read (step S149). In a case where the active power upper limit value control is not effective, the processing is restarted from a position of a reference numeral C in FIG. 17.

After step S149, whether or not change rate control of the active power P is effective is determined (step S150). In a case where the change rate control is not effective, the processing in step S151 and S152 is skipped, and the processing proceeds next. The subsequent processing is restarted from a position of a reference numeral B in FIG. 17.

In a case where the change rate control is effective, whether or not the active power upper limit value Pr falls within a predetermined range is determined (step S151). Specifically, whether or not a condition of the following expression (2) is satisfied is determined.

$$P \text{ lower limit value} \leq Pr \leq P \text{ upper limit value} \quad (2)$$

In a case where the condition of the expression (2) is satisfied, the processing in step S152 is skipped, and the processing proceeds next. In a case where the condition of the expression (2) is not satisfied, a value of the active power upper limit value Pr is set at a value of one of the P lower limit value and the P upper limit value (step S152). By this means, the value of the active power upper limit value Pr is limited within a certain range. The subsequent processing is restarted from a position of the reference numeral B in FIG. 17.

Subsequently, the routine in FIG. 17 will be described. If the processing is restarted from the position of the reference numeral A in FIG. 17, a value of Pf is assigned to target active power Ptarget (step S160). If the processing is restarted from the position of the reference numeral B in FIG. 17, a value of Pr is assigned to the target active power Ptarget (step S161). If the processing is restarted from the position of the reference numeral C in FIG. 17, the processing proceeds to step S162 without the target active power Ptarget being not set in step S160 and step S161.

Then, whether or not change rate control of the reactive power Q is effective is determined (step S162). If the change rate control of the reactive power Q is effective, a Q upper limit value and a Q lower limit value are respectively calculated (step S163), while if the change rate control of the reactive power Q is not effective, the processing in step S163 is skipped, and the processing proceeds to step S164.

Then, whether or not voltage control is effective is determined (step S164). If the voltage control is effective, processing of performing voltage control is executed (step S165). In this step, a value for voltage control Q is assigned to Qv. Subsequently, a value of the above-described Qv is assigned to target reactive power Qtarget (step S166).

Then, setting value Pf limit processing (step group SG1) in FIG. 16 is executed. Then, whether or not a value of Qtarget falls within a predetermined range determined in advance is determined (step S167). Specifically, whether or not a condition of the following expression (3) is satisfied is determined.

$$Q \text{ lower limit value} \leq Q\text{target} \leq Q \text{ upper limit value} \quad (3)$$

In a case where the condition of the expression (3) is satisfied, the processing in step S168 is skipped, and processing of this time ends. In a case where the condition of the expression (3) is not satisfied, a value of the target reactive power Qtarget is set at a value of one of the Q lower limit value and the Q upper limit value (step S168). By this means, a value of the target reactive power Qtarget is limited within a certain range. Subsequently, processing of this time ends.

Meanwhile, if it is determined in step S164 that the voltage control is not effective, then, whether or not power factor control is effective is determined (step S169). If the power factor control is effective, processing of performing power factor control is executed (step S170). In this step, a value for power factor control Qpf is assigned to Qpf. Subsequently, a value of the above-described Qpf is assigned to the target reactive power Qtarget (step S171). Because the subsequent processing is step S167, and its content is as described above, description will be omitted.

If it is determined in step S169 that the power factor control is not effective, then, whether or not Q direct designation control is effective is determined (step S172). If the Q direct designation control is effective, processing of performing the Q direct designation control is executed (step S173). In this step, a Q estimate value is assigned to Qd. Subsequently, a value of the above-described Qd is assigned to the target reactive power Qtarget (step S174). Because the subsequent processing is step S167, and its content is as described above, description will be omitted.

If it is determined in step S172 that the Q direct designation control is not effective, the processing proceeds to step S167 without processing of setting the target reactive power Qtarget in step S166, step S171 and step S174 being performed.

FIG. 18 illustrates computation processing of backup control during power outage. In FIG. 18, first, whether or not power outage occurs is detected (step S180). If power outage does not occur, the routine in FIG. 18 ends.

In a case where power outage occurs, processing of resetting a power outage period is performed (step S181). In this step, 0 is assigned to a power outage period t.

Then, the power outage period is counted (step S182). In this step, the power outage period t is counted in accordance with the following expression (4). Note that n is a control period.

$$t = t + 1 \times n \quad (4)$$

Then, processing of stopping all the power conversion apparatuses (that is, inverters) is executed (step S183). The multi-storage battery control apparatus 3 transmits a stop command to all the power conversion apparatuses 20 respectively included in the photovoltaic power generation facility 61, the wind power generation facility 62, and the plurality of storage battery facilities 2a, 2b, 2c.

Then, processing for satisfying a condition for allowing the power conversion apparatus 20 included in the storage battery facility 2c to autonomously operate is executed (step S184). In this step, a circuit configuration of the power system 1 is switched as preparation for autonomous operation during power outage.

Then, the multi-storage battery control apparatus 3 transmits an autonomous operation command to the power conversion apparatus 20 included in the storage battery facility 2c (step S185). Further, the multi-storage battery control apparatus 3 transmits a control command to start up a storage battery for long-term charge-discharge (step S186).

Then, processing of computing a charge-discharge amount for backup during power outage BKUP_BAT is executed in accordance with the following expression (5) (step S187). Note that, in the expression (5), the total generated power is generated power obtained by totaling an amount of generated power of all of the photovoltaic power generation facilities 61 and an amount of generated power of all of the wind power generation facilities 62, and total power consumption is a sum of power consumption of the first load 7a and power consumption of the second load 7b.

$$\text{BKUP\_BAT} = \text{total generated power} - \text{total power consumption} \quad (5)$$

Subsequently, the routine of this time ends.

FIG. 19 illustrates computation processing regarding load reduction control. In the routine in FIG. 19, first, whether or not a load exceeds a peak-cut level is determined (step S190). This load is a sum of the first load 7a and the second load 7b. The peak-cut level is set in the load status database 33a illustrated in FIG. 8.

If the load exceeds the peak-cut level in step S190, subsequently, the following expression (6) is executed, and, as a result, a load reduction quick charge-discharge amount eLOAD_BAT is calculated (step S191). Note that LSUM in the expression (6) is a total load of the first load 7a and the second load 7b. Subsequently, the routine of this time ends.

$$e\text{LOAD\_BAT} = \text{peak-cut level} - L\text{SUM} \quad (6)$$

Meanwhile, in a case where the load does not exceed the peak-cut level in step S190, subsequently, the following expression (7) is executed, and, as a result, a load reduction charge-discharge amount pLOAD_BAT is calculated in accordance with a load plan and a load status (step S192). LOAD_PLAN(t) is a load plan at current time t. Note that, it is assumed in the present example that the load plan at current time t is acquired from database values illustrated in FIG. 9 to FIG. 11.

$$p\text{LOAD\_BAT} = \text{LOAD\_PLAN}(t) \quad (7)$$

Then, the processing proceeds to step S193, and, in this step, determination indicated in the following expression (8) is executed. LOAD(t) is power consumption at current time t. α in the expression (8) is an error reference value determined in advance.

$$(\text{LOAD\_PLAN}(t) - \text{LOAD}(t)) > \alpha \quad (8)$$

In a case where a determination result of the expression (8) is positive (Yes), a numerical value of the load result in the load plan database 33b is updated (step S194). Then, the routine of this time ends. Meanwhile, if the determination result of the expression (8) is negative (No), the routine of this time ends without the load plan database 33b being updated.

Figure 20:
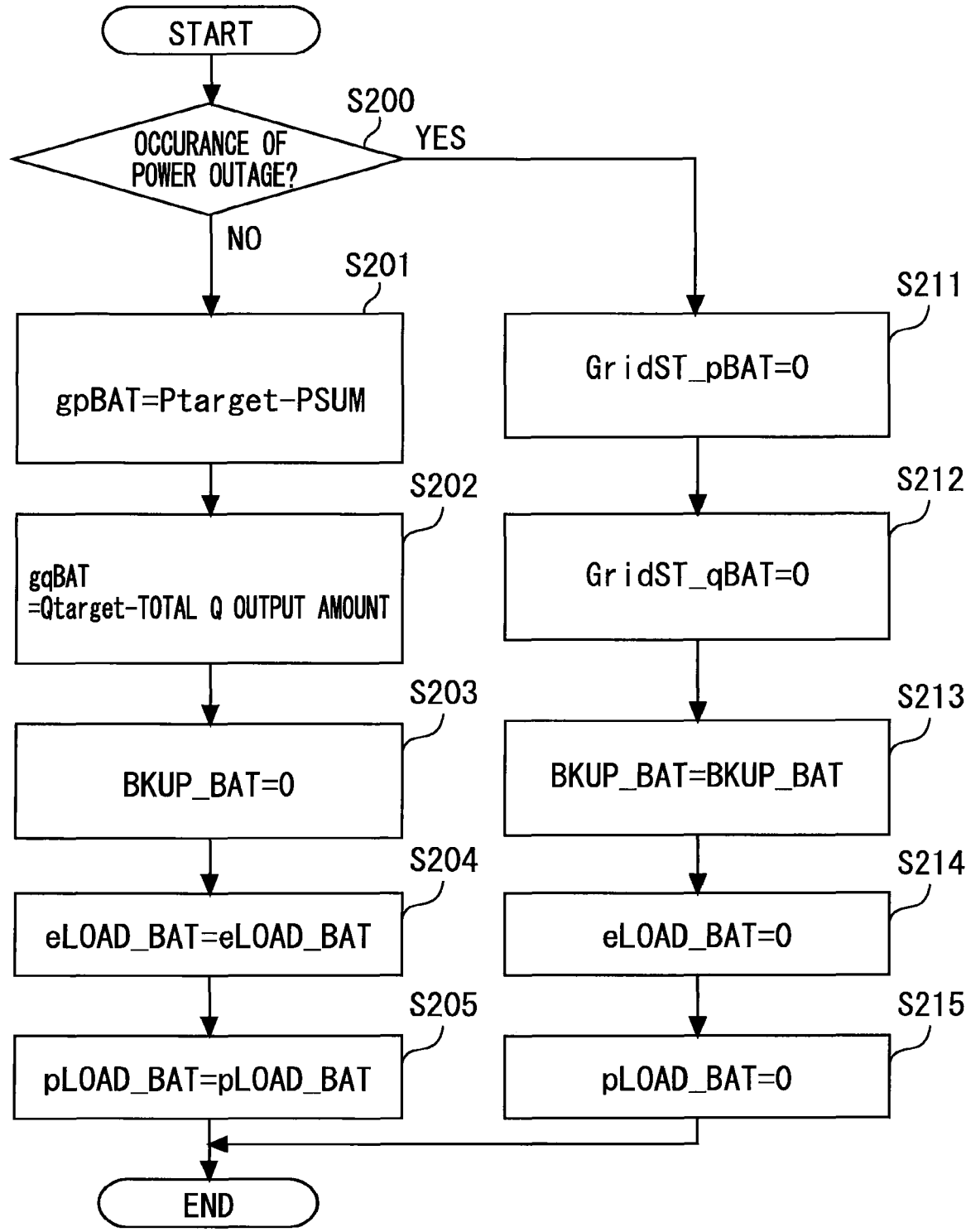
FIG. 20 is a flowchart of the control routine to be executed in the power system according to the example of the present application.

FIG. 20 is a routine for determining a charge-discharge amount for each type of application. In the routine in FIG. 20, first, whether or not the electric power grid 4 is in a state where power outage occurs is determined (step S200).

In a case where the electric power grid 4 is not in a state where power outage occurs, gpBAT which is an active power charge-discharge amount for grid stabilizing control is calculated in accordance with an expression (9) (step S201). PSUM in the expression (9) is a total amount of power generated by the photovoltaic power generation facility 61 and the wind power generation facility 62.

$$gp\text{BAT} = P\text{target} - P\text{SUM} \quad (9)$$

Then, gqBAT which is a reactive power charge-discharge amount for grid stabilizing control is calculated in accordance with an expression (10) (step S202). A total Q output amount in the expression (10) is a total amount of reactive power output of the photovoltaic power generation facility 61 and the wind power generation facility 62.

$$gq\text{BAT} = Q\text{target} - \text{total } Q \text{ output amount} \quad (10)$$

Then, 0 is assigned to BKUP_BAT which is a charge-discharge amount for backup during power outage (step S203). BKUP_BAT may be 0 because power outage does not occur.

Then, a value of eLOAD_BAT calculated in step S191 in FIG. 19 is assigned to eLOAD_BAT which is the load reduction quick charge-discharge amount (step S204). A value of pLOAD_BAT calculated in step S192 in FIG. 19 is assigned to pLOAD_BAT which is the load reduction charge-discharge amount (step S205). Subsequently, the routine of this time ends.

Meanwhile, in a case where the electric power grid 4 is in a state where power outage occurs, the processing proceeds to step S211. Note that it is assumed that, at a time point at which power outage occurs, the power system 1 is disconnected from the electric power grid 4 and the power system 1 is in an autonomous operation mode in accordance with the control routine in FIG. 18 which has already been described.

First, 0 is assigned to GridST_pBAT which is the active power charge-discharge amount for grid stabilizing control in a state where power outage occurs (step S211). Then, 0 is assigned to GridST_qBAT which is the reactive power charge-discharge amount for grid stabilizing control in a state where power outage occurs (step S212). Then, a value of BKUP_BAT calculated in step S187 in FIG. 18 is assigned to BKUP_BAT which is a charge-discharge amount for backup during power outage. Then, 0 is assigned to eLOAD_BAT which is the load reduction quick charge-discharge amount (step S214). Then, 0 is assigned to pLOAD_BAT which is the load reduction charge-discharge amount (step S215). Thereafter, the routine of this time ends.

Figure 21:
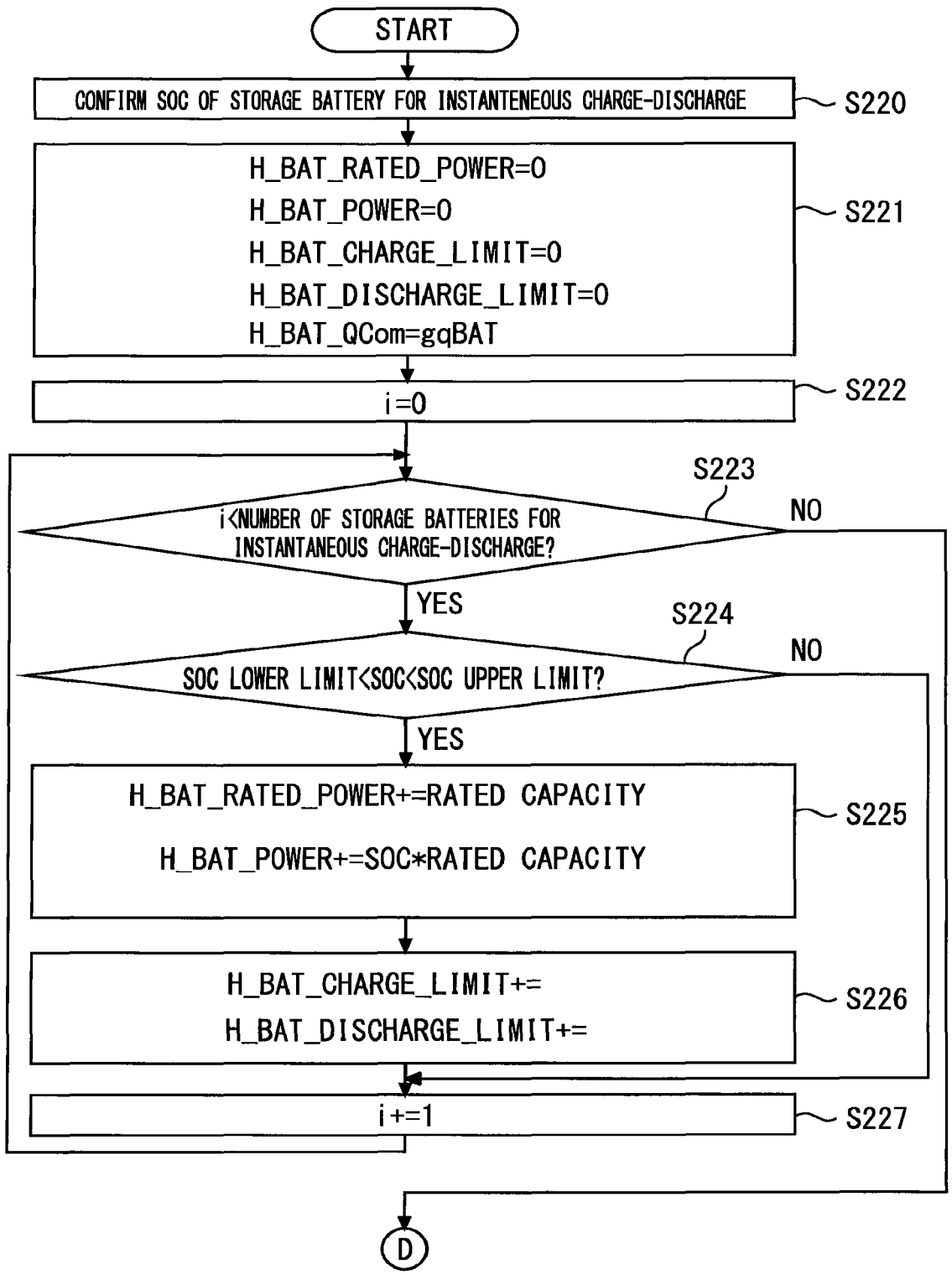
FIG. 21 is a flowchart of control routine to be executed in the power system according to the example of the present application.
Figure 22:
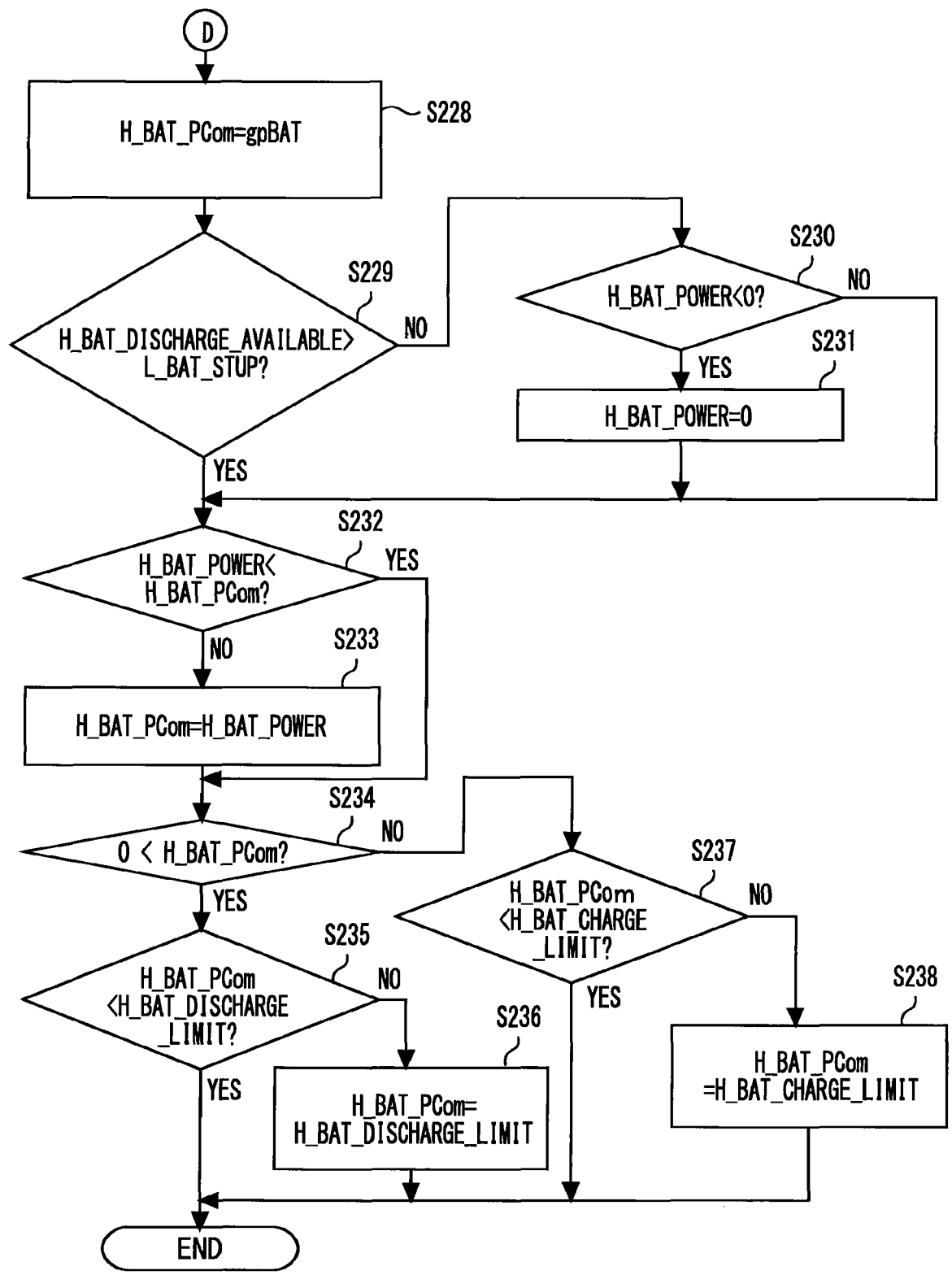
FIG. 22 is a flowchart of the control routine to be executed in the power system according to the example of the present application.

FIG. 21 and FIG. 22 are processing of determining the charge-discharge amount for each storage battery for instantaneous charge-discharge. In the routine in FIG. 21, first, SOC of respective first storage batteries 2a1 to 2a4 which are storage batteries allocated for instantaneous charge-discharge is confirmed (step S220). Confirmation of the SOC is realized by the multi-storage battery control apparatus 3 communicating with individual storage battery management units 102.

Then, various kinds of storage battery information parameters are reset (step S221). First, 0 is assigned to H_BAT_RATED_POWER. H_BAT_RATED_POWER is a parameter for indicating a rated value of a charge-discharge amount of a storage battery for instantaneous charge-discharge. Then, 0 is assigned to H_BAT_POWER. H_BAT_POWER is a parameter for indicating a current value of the charge-discharge amount of the storage battery for instantaneous charge-discharge. Then, 0 is assigned to H_BAT_CHARGE_LIMIT. H_BAT_CHARGE_LIMIT is a parameter for indicating a charge limit value of the storage battery for instantaneous charge-discharge. Then, 0 is assigned to H_BAT_DISCHARGE_LIMIT. H_BAT_DISCHARGE_LIMIT is a parameter for indicating a discharge limit value of the storage battery for instantaneous charge-discharge. Then, gqBAT is assigned to H_BAT_QCom which is a reactive power output amount. gqBAT is a value calculated in the expression (10) in step S202 in FIG. 20.

Then, 0 is assigned to i (step S222).

Then, whether or not i exceeds the number of storage batteries for instantaneous charge-discharge is determined (step S223). As described in the storage battery information database 35a in FIG. 5, the number of storage batteries for instantaneous charge-discharge in the present example is "4".

In the present routine, an identifier i is used to identify four storage batteries for instantaneous charge-discharge. In the present example, identification numbers of 1, 2, 3 and 4 are assigned to the first storage batteries 2a1 to 2a4 in this order. The storage battery to which a number corresponding to a current value of the identifier i is provided will be also referred to as an i-th storage battery.

Then, whether or not the SOC fall within a predetermined range is determined on the basis of the following expression (11) (step S224). First, the SOC of the i-th storage battery among the first storage batteries 2a1 to 2a4 for instantaneous charge-discharge, an SOC upper limit value and an SOC lower limit value are read from the storage battery information database 35a. Determination processing is performed while the read values are assigned to the following expression (11). Note that, in a case where a condition of the following expression (11) is not satisfied, the processing jumps to step S227.

$$\text{SOC lower limit value} < \text{SOC} < \text{SOC upper limit value} \tag{11}$$

In a case where the condition of the expression (11) is satisfied, then, values of various kinds of storage battery information are added up. First, in step S225, rated capacity and the current SOC of the i-th storage battery among the first storage batteries 2a1 to 2a4 for instantaneous charge-discharge are read. A value of the read rated capacity is added to H_BAT_RATED_POWER which is a rated value of the charge-discharge amount of the storage battery for instantaneous charge-discharge. A value obtained by integrating rated capacity to the read current SOC is added to H_BAT_POWER which is a current value of the charge-discharge amount of the storage battery for instantaneous charge-discharge.

Further, in step S226, the charge limit value and the discharge limit value of the i-th storage battery among the first storage batteries 2a1 to 2a4 for instantaneous charge-discharge are read out. The readout charge limit value is added to H_BAT_CHARGE_LIMIT which is a charge limit value for instantaneous charge-discharge. The readout discharge limit value is added to H_BAT_DISCHARGE_LIMIT which is a discharge limit value for instantaneous charge-discharge.

Thereafter, i is incremented (step S227), and the processing loops to step S223. By this means, it is possible to respectively compute a total value of rated capacity, a total value of the current SOC, a total value of the charge limit values, and a total value of the discharge limit values for the first storage batteries 2a1 to 2a4 for instantaneous charge-discharge. A series of processing from step S220 to S227 corresponds to "simulation of a virtual single storage battery" described in the embodiment. When i becomes 5, the processing breaks a loop in step S223.

Then, the processing proceeds to step S228 in FIG. 22. In step S228, a value of gpBAT is assigned to a value of H_BAT_PCom which is the instantaneous charge-discharge amount of active power in accordance with the following expression (12). gpBAT is a value set in step S201 in FIG. 20.

$$H\_BAT\_PCom = gpBAT \tag{12}$$

Then, determination processing regarding a startup power amount is performed (step S229). In this step, whether or not H_BAT_DISCHARGE_AVAILABLE is greater than L_BAT_STUP is determined. H_BAT_DISCHARGE_AVAILABLE is a power amount which can be discharged at the storage battery for instantaneous charge-discharge. L_BAT_STUP is a startup power amount of the storage battery for long-term charge-discharge. The power amount which can be discharged at the storage battery for instantaneous charge-discharge is a sum of the power amount which can be discharged at the first storage batteries 2a1 to 2a4 for instantaneous charge-discharge. If a condition in step S229 is satisfied, the first storage batteries 2a1 to 2a4 for instantaneous charge-discharge can discharge power which exceeds the startup power amount of the storage battery for long-term charge-discharge. In this case, the processing in step S230 and S231 is skipped, and the processing proceeds to step S232.

In a case where the condition in step S229 is not satisfied, power which can be discharged at the first storage batteries 2a1 to 2a4 for instantaneous charge-discharge does not reach the startup power amount of the storage battery for long-term charge-discharge. In this case, the processing proceeds to step S230, and whether or not H_BAT_POWER is less than 0 is determined. In a case where the condition in step S230 is satisfied, 0 is assigned to H_BAT_POWER (step S231).

In a case where H_BAT_POWER is equal to or greater than 0 in step S230, the processing in step S231 is skipped, and the processing proceeds to step S232.

In step S232, whether or not H_BAT_POWER falls below H_BAT_PCom is determined on the basis of the following expression (13). If the condition of the expression (13) is satisfied, the processing in step S233 is skipped, and the processing proceeds to step S234.

$$H\_BAT\_POWER < H\_BAT\_PCom \tag{13}$$

In a case where the condition of the expression (13) is not satisfied, H_BAT_POWER is equal to or greater than H_BAT_PCom. Therefore, in this case, calculation processing of assigning a value of H_BAT_POWER to H_BAT_PCom is executed (step S233).

Then, whether or not H_BAT_PCom is greater than 0 is determined (step S234). Note that, when H_BAT_PCom is greater than 0, H_BAT_PCom is a positive value, and a discharge command is output. Inversely, in a case where H_BAT_PCom is a negative value smaller than 0, a charge command is output.

In a case where H_BAT_PCom is greater than 0, further, determination processing in the following expression (14) is executed (step S235). In a case where the condition of the expression (14) is satisfied, the routine of this time ends.

$$H\_BAT\_PCom < H\_BAT\_DISCHARGE\_LIMIT \tag{14}$$

In a case where the condition of the expression (14) is not satisfied, the processing proceeds to step S236. In this step, a value of H_BAT_DISCHARGE_LIMIT is assigned to H_BAT_PCom. By this means, it is possible to impose a limitation by the discharge limit value.

Meanwhile, in a case where H_BAT_PCom is equal to or less than 0 in step S234, determination processing of the following expression (15) is executed (step S237). In a case where the condition of the expression (15) is satisfied, the routine of this time ends.

$$H\_BAT\_PCom < H\_BAT\_CHARGE\_LIMIT \tag{15}$$

In a case where the condition of the expression (15) is not satisfied, the processing proceeds to step S238. In this step, a value of H_BAT_CHARGE_LIMIT is assigned to H_BAT_PCom. By this means, it is possible to impose a limitation by the charge limit value.

Figure 23:
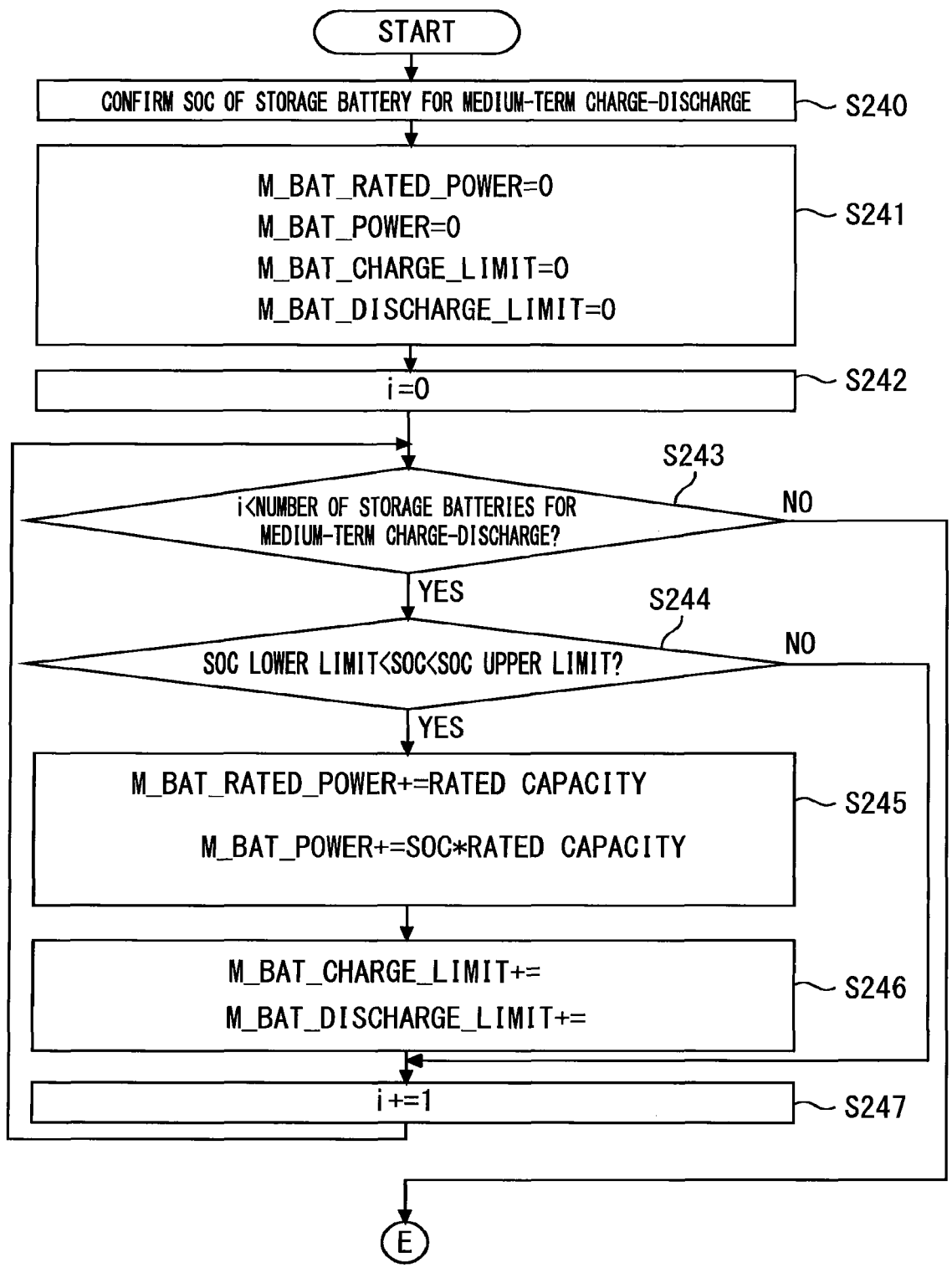
FIG. 23 is a flowchart of the control routine to be executed in the power system according to the example of the present application.
Figure 24:
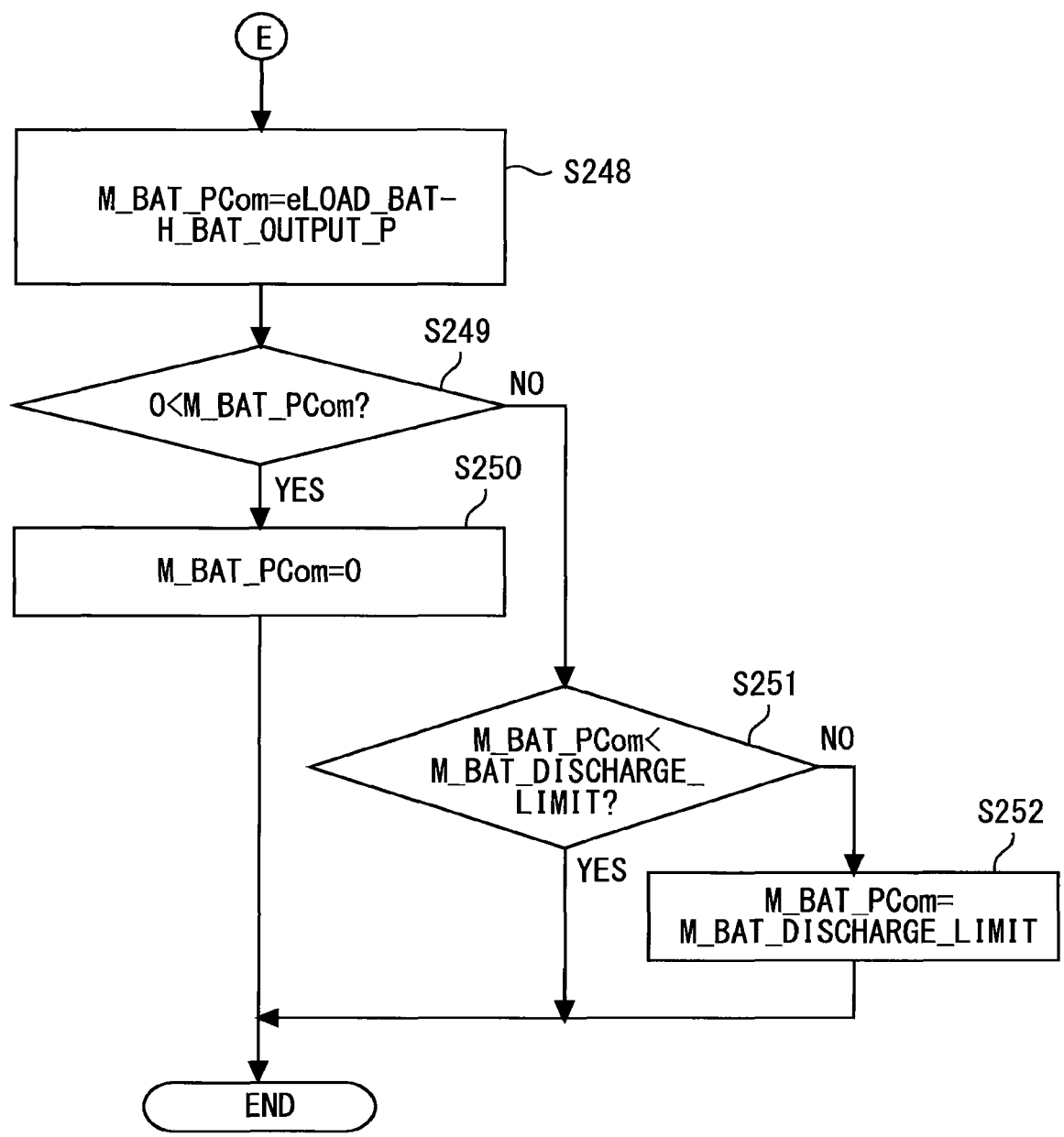
FIG. 24 is a flowchart of the control routine to be executed in the power system according to the example of the present application.

FIG. 23 and FIG. 24 are processing of determining a charge-discharge amount for each storage battery for medium-term charge-discharge. Processing content in FIG. 23 and FIG. 24 is similar to the above-described processing content in FIG. 21 and FIG. 22 although parameters to be used for processing are different.

In the routine in FIG. 23, first, the SOC of the second storage battery 2b1 which is a storage battery allocated as the storage battery for medium-term charge-discharge is confirmed (step S240). Confirmation of the SOC is realized by the multi-storage battery control apparatus 3 communicating with the individual storage battery management units 102.

Then, various kinds of storage battery information parameters are reset (step S241). First, 0 is assigned to M_BAT_RATED_POWER. M_BAT_RATED_POWER is a parameter for indicating a rated value of the charge amount of the storage battery for medium-term charge-discharge. Then, 0 is assigned to M_BAT_POWER. M_BAT_POWER is a parameter for indicating a current value of the charge amount of the storage battery for medium-term charge-discharge. Then, 0 is assigned to M_BAT_CHARGE_LIMIT. M_BAT_CHARGE_LIMIT is a parameter for indicating a charge limit value of the storage battery for medium-term charge-discharge. Then, 0 is assigned to M_BAT_DISCHARGE_LIMIT. M_BAT_DISCHARGE_LIMIT is a parameter for indicating a discharge limit value of the storage battery for medium-term charge-discharge.

Then, 0 is assigned to i (step S242).

Then, whether or not i exceeds the number of storage batteries for medium-term charge-discharge is determined (step S243). As described in the storage battery information database 35a in FIG. 5, the number of storage batteries for medium-term charge-discharge in the present example is "1".

In the present routine, to identify the storage battery for medium-term charge-discharge, an identifier i is used. In the present example, an identification number of 1 is provided to the second storage battery 2b1. The storage battery to which a number corresponding to a current value of the identifier i is provided will be also referred to as an i-th storage battery.

Note that, while, in the present example, the storage battery for medium-term charge-discharge is only the second storage battery 2b1, it is also possible to increase types of the storage battery for medium-term charge-discharge as a modified example. In this case, it is only necessary to increase the number of storage batteries for medium-term charge-discharge by the number corresponding to the increased number of types.

Then, whether or not the SOC falls within a predetermined range is determined on the basis of the following expression (16) (step S244). First, the SOC, an SOC upper limit value, and an SOC lower limit value of the i-th storage battery among the second storage battery 2b1 for medium-term charge-discharge are read out from the storage battery information database 35a. Determination processing is performed while the readout values are assigned to the following expression (16). Note that, in a case where a condition of the following expression (16) is not satisfied, the processing jumps to step S247.

$$\text{SOC lower limit value} < \text{SOC} < \text{SOC upper limit value} \quad (16)$$

In a case where the condition of the expression (16) is satisfied, then, values of various kinds of storage battery information are added up. First, in step S245, rated capacity and the current SOC of the i-th storage battery among the second storage battery 2b1 for medium-term charge-discharge are read out. A value of the readout rated capacity is added to M_BAT_RATED_POWER which is a rated value of the charge amount of the storage battery for medium-term charge-discharge. A value obtained by integrating the rated capacity to the readout current SOC is added to M_BAT_POWER which is a current value of the charge amount of the storage battery for medium-term charge-discharge.

Further, in step S246, the charge limit value and the discharge limit value of the i-the storage battery among the second storage battery 2b1 for medium-term charge-discharge are read out. The readout charge limit value is added to M_BAT_CHARGE_LIMIT which is a charge limit value for medium-term charge-discharge. The readout discharge limit value is added to M_BAT_DISCHARGE_LIMIT which is a discharge limit value for medium-term charge-discharge.

Thereafter, i is incremented (step S247), and the processing loops to step S243. By this means, it is possible to respectively compute a total value of the rated capacity for the second storage battery 2b1 for medium-term charge-discharge, a total value of the current SOC, a total value of the charge limit values, and a total value of the discharge limit values. This series of processing from step S240 to S247 corresponds to "simulation of a virtual single storage battery" described in the embodiment.

Note that, because, in the present example, the storage battery for medium-term charge-discharge is only the second storage battery 2b1, when i becomes 2, the processing breaks a loop in step S243. Therefore, processing of causing a plurality of storage batteries for medium-term charge-discharge to simulate a virtual single storage battery is not performed. However, as a modified example, in a case where other second storage batteries are added in addition to the second storage battery 2b1 for medium-term charge-discharge, this series of processing from step S240 to S247 effectively function.

Then, the processing proceeds to step S248 in FIG. 24. In step S248, M_BAT_PCom which is the medium-term charge-discharge amount of the active power is set in accordance with the following expression (17). eLOAD_BAT is a value set in step S204 in FIG. 20.

$$M\_BAT\_PCom = eLOAD\_BAT - H\_BAT\_OUTPUT\_P \quad (17)$$

Then, whether or not M_BAT_PCom is greater than 0 is determined (step S249). Note that, when M_BAT_PCom is greater than 0, M_BAT_PCom is a positive value, and a discharge command is output. Inversely, in a case where M_BAT_PCom is a negative value equal to or less than 0, a charge command is output.

In a case where M_BAT_PCom is greater than 0, 0 is assigned to M_BAT_PCom (step S250). Thereafter, the routine of this time ends.

Meanwhile, in a case where M_BAT_PCom is equal to or less than 0 in step S249, determination processing of the following expression (18) is executed (step S251). In a case where the condition of the expression (18) is satisfied, the routine of this time ends.

$$M\_BAT\_PCom < M\_BAT\_DISCHARGE\_LIMIT \quad (18)$$

In a case where the condition of the expression (18) is not satisfied, the processing proceeds to step S252. In this step, a value of M_BAT_DISCHARGE_LIMIT is assigned to M_BAT_PCom. By this means, it is possible to impose a limitation by the discharge limit value.

Figure 25:
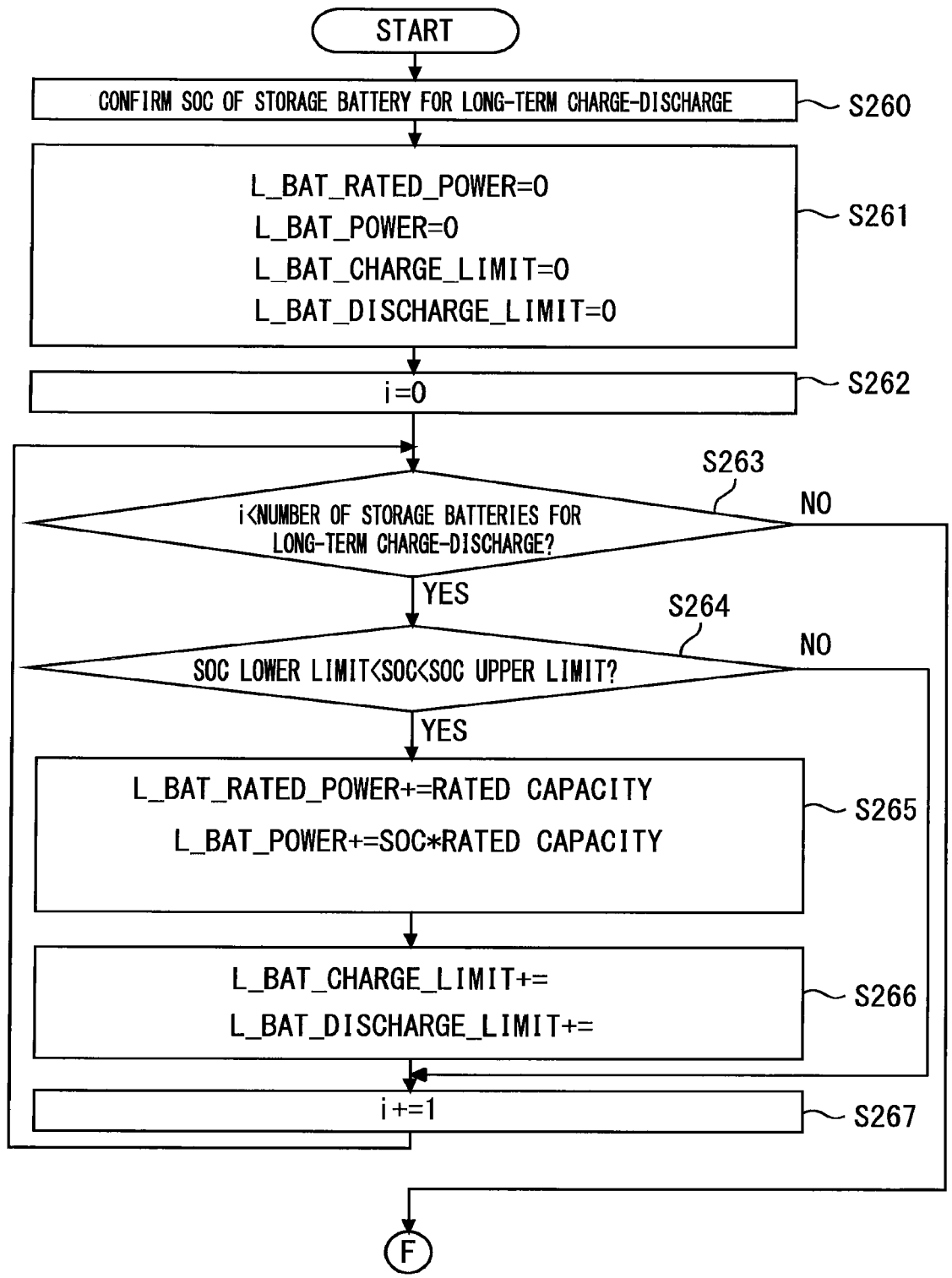
FIG. 25 is a flowchart of the control routine to be executed in the power system according to the example of the present application.
Figure 26:
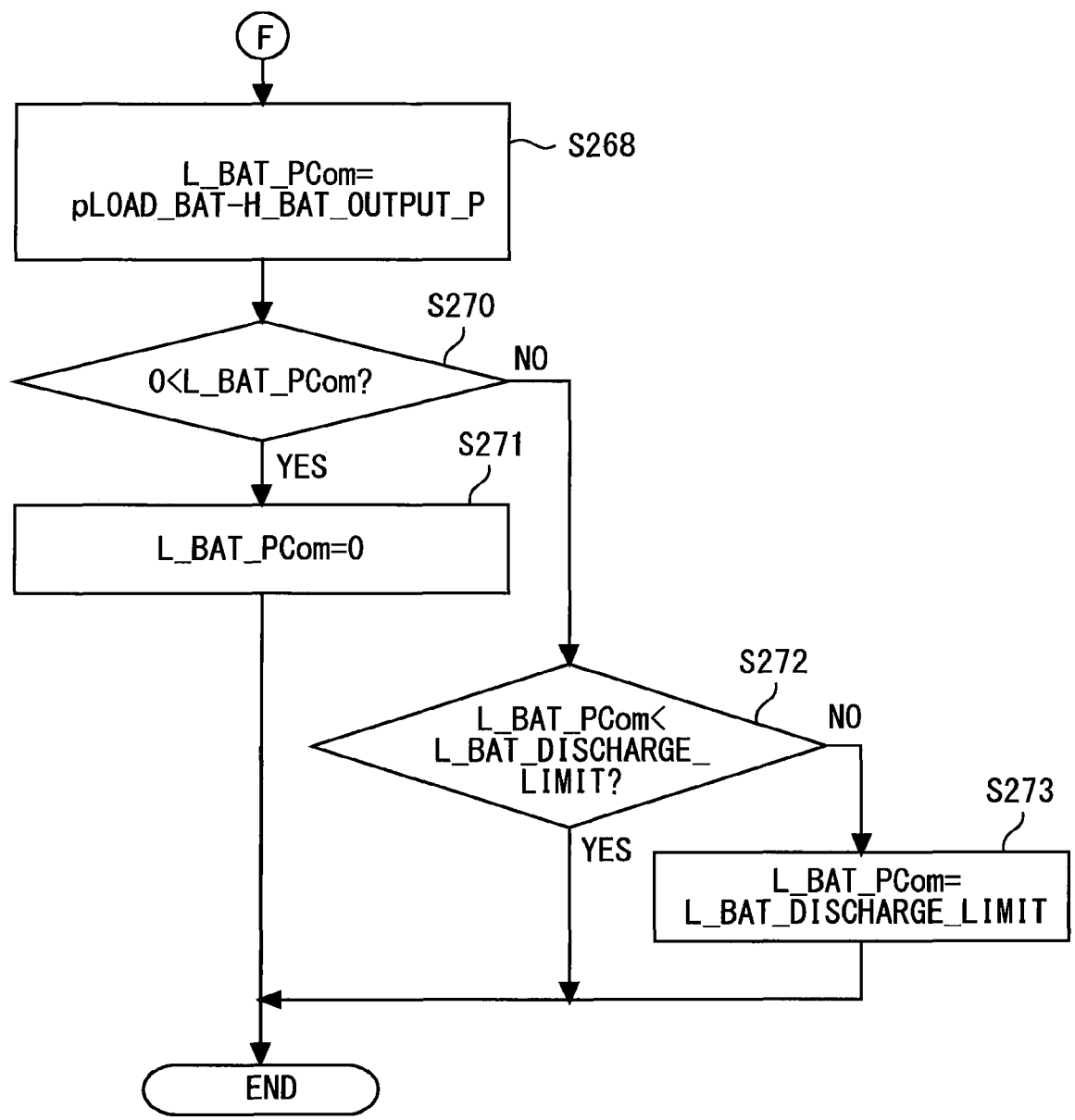
FIG. 26 is a flowchart of the control routine to be executed in the power system according to the example of the present application.

FIG. 25 and FIG. 26 are processing of determining a charge-discharge amount for each storage battery for charge-discharge during power outage. Processing content in FIG. 25 and FIG. 26 is similar to the above-described processing content in FIG. 21 and FIG. 22 although parameters to be used for processing are different.

In the routine in FIG. 25, first, the SOC of the third storage batteries $2c1$ to $2c2$ which are storage batteries allocated as storage batteries for long-term charge-discharge is confirmed (step S260). Confirmation of the SOC is realized by the multi-storage battery control apparatus 3 communicating with the individual storage battery management units 102.

Then, various kinds of storage battery information parameters are reset (step S261). First, 0 is assigned to L_BAT_RATED_POWER. L_BAT_RATED_POWER is a parameter for indicating a rated value of the charge amount of the storage battery for long-term charge-discharge. Then, 0 is assigned to L_BAT_POWER. L_BAT_POWER is a parameter for indicating a current value of the charge amount of the storage battery for long-term charge-discharge. Then, 0 is assigned to L_BAT_CHARGE_LIMIT. L_BAT_CHARGE_LIMIT is a parameter for indicating a charge limit value of the storage battery for long-term charge-discharge. Then, 0 is assigned to L_BAT_DISCHARGE_LIMIT. L_BAT_DISCHARGE_LIMIT is a parameter for indicating a discharge limit value of the storage battery for long-term charge-discharge.

Then, 0 is assigned to i (step S262).

Then, whether or not i exceeds the number of storage batteries for long-term charge-discharge is determined (step S263). As described in the storage battery information database 35a in FIG. 5, the number of storage batteries for long-term charge-discharge in the present example is "2".

In the present routine, to identify two storage batteries for long-term charge-discharge, an identifier i is used. In the present example, identification numbers of 1 and 2 are provided to the third storage batteries $2e1$ and $2c2$ in this order. A storage battery to which a number corresponding to a current value of the identifier i is provided will be also referred to as the i-th storage battery.

Then, whether or not the SOC falls within a predetermined range is determined on the basis of the following expression (19) (step S264). First, the SOC, an SOC upper limit value and an SOC lower limit value of the i-th storage battery among the third storage batteries $2c1$ to $2c2$ for long-term charge-discharge are read out from the storage battery information database 35a. Determination processing is performed while the readout values are assigned to the following expression (19). Note that, in a case where the condition of the following expression (19) is not satisfied, the processing jumps to step S267.

$$\text{SOC lower limit value} < \text{SOC} < \text{SOC upper limit value} \quad (19)$$

In a case where the condition of the expression (19) is satisfied, then, values of various kinds of storage battery information are added up. First, in step S265, rated capacity and the current SOC of the i-th storage battery among the third storage batteries $2c1$ to $2c2$ for long-term charge-discharge are read out. A value of the readout rated capacity is added to L_BAT_RATED_POWER which is a rated value of the charge amount of the storage battery for long-term charge-discharge. A value obtained by integrating the rated capacity to the readout current SOC is added to L_BAT_POWER which is a current value of the charge amount of the storage battery for long-term charge-discharge.

Further, in step S266, the charge limit value and the discharge limit value of the i-th storage battery among the third storage batteries $2c1$ to $2c2$ for long-term charge-discharge are read out. The readout charge limit value is added to L_BAT_CHARGE_LIMIT which is the charge limit value for long-term charge-discharge. The readout discharge limit value is added to L_BAT_DISCHARGE_LIMIT which is the discharge limit value for long-term charge-discharge.

Thereafter, i is incremented (step S267), and the processing loops to step S263. By this means, it is possible to respectively compute a total value of rated capacity, a total value of the current SOC, a total value of the charge limit values, and a total value of the discharge limit values for the third storage batteries $2c1$ to $2c2$ for long-term charge-discharge. This series of processing from step S260 to S267 corresponds to "simulation of a virtual single storage battery" described in the embodiment.

Then, the processing proceeds to step S268 in FIG. 26. In step S268, L_BAT_Pcom which is the long-term charge-discharge amount of the active power is set in accordance with the following expression (20). pLOAD_BAT in the expression (20) is a value set in step S204 in FIG. 20.

$$L\_BAT\_P\text{Com} = p\text{LOAD\_BAT} - H\_BAT\_OUTPUT\_P \quad (20)$$

Then, whether or not L_BAT_PCom is greater than 0 is determined (step S270). Note that, when L_BAT_PCom is greater than 0, L_BAT_PCom is a positive value, and a discharge command is output. Inversely, in a case where L_BAT_PCom is a negative value equal to or less than 0, a charge command is output.

In a case where L_BAT_PCom is greater than 0, 0 is assigned to L_BAT_PCom (step S271). Thereafter, the routine of this time ends.

Meanwhile, in a case where L_BAT_PCom is equal to or less than 0 in step S270, determination processing of the following expression (21) is executed (step S272). In a case where the condition of the expression (21) is satisfied, the routine of this time ends.

$$L\_BAT\_P\text{Com} < L\_BAT\_DISCHARGE\_LIMIT \quad (21)$$

In a case where the condition of the expression (21) is not satisfied, the processing proceeds to step S273. In this step, a value of L_BAT_DISCHARGE_LIMIT is assigned to L_BAT_PCom. By this means, it is possible to impose a limitation by the discharge limit value.

Figure 27:
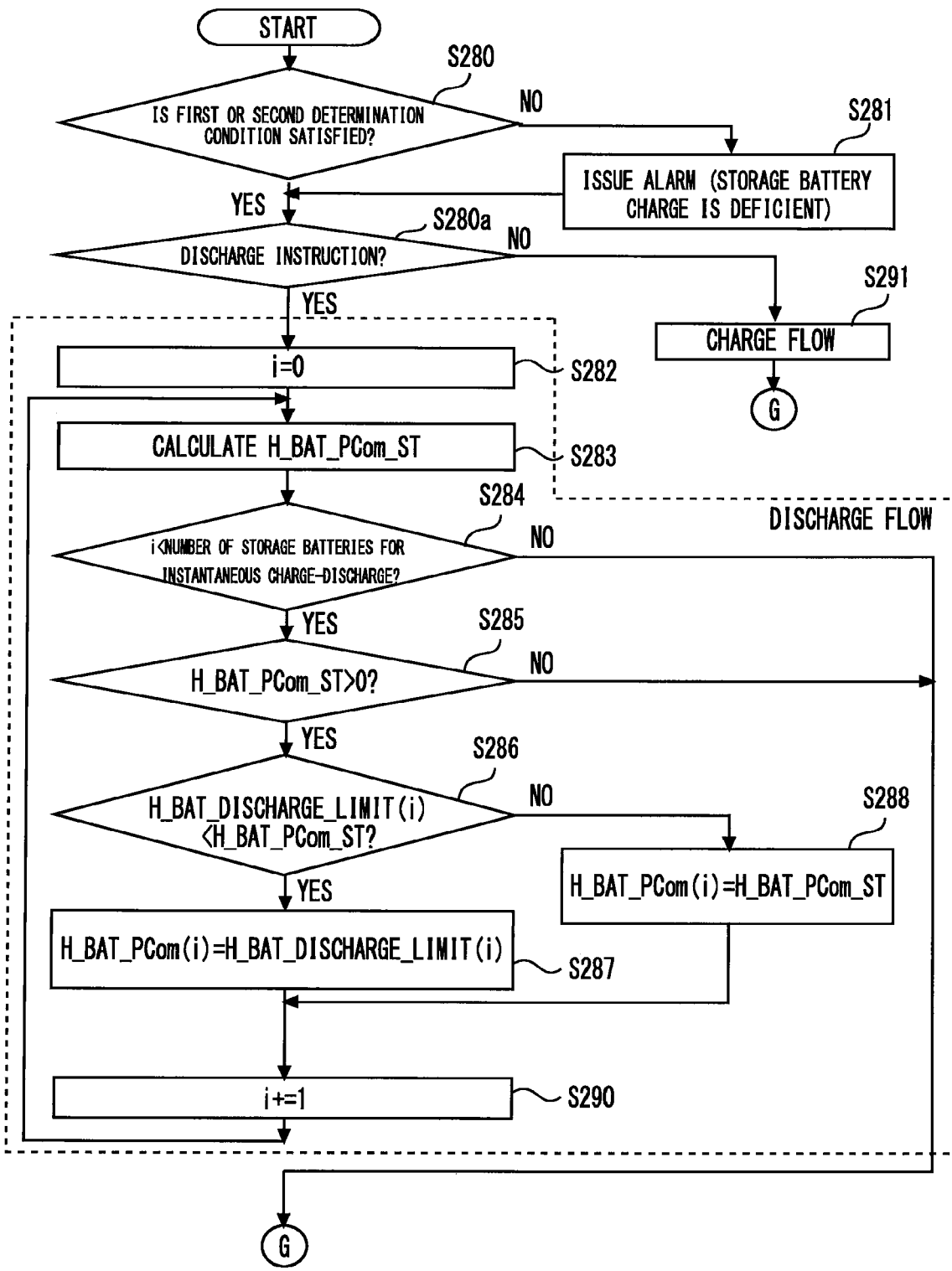
FIG. 27 is a flowchart of the control routine to be executed in the power system according to the example of the present application.
Figure 28:
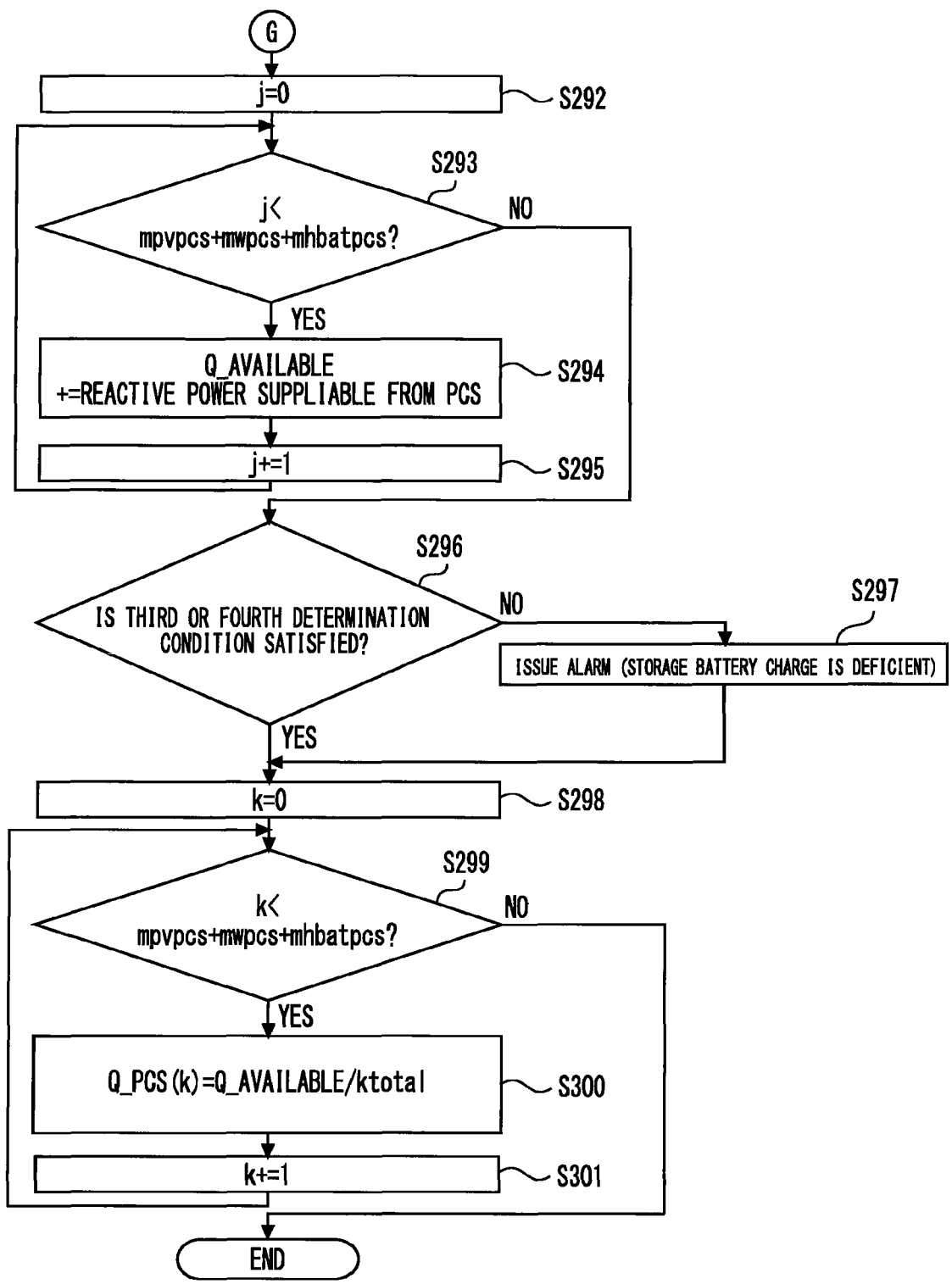
FIG. 28 is a flowchart of the control routine to be executed in the power system according to the example of the present application.

FIG. 27 and FIG. 28 are processing for outputting a storage battery control command. Here, a routine for instantaneous charge-discharge will be described as a typical example.

In the routine in FIG. 27, first, an OR condition of the following first determination condition and second determination condition is determined (step S280). In a case where one of the first determination condition and the second determination condition is satisfied, a determination result in step S280 becomes positive (Yes).

The first determination condition is an AND condition of the following expression (22) and expression (23). That is, in a case where both conditions of the expression (22) and the expression (23) are satisfied, the first determination condition is satisfied.

$$0 < H\_BAT\_P\text{Com} \quad (22)$$

$$H\_BAT\_P\text{Com} < H\_BAT\_POWER \quad (23)$$

If the expression (22) is satisfied, because the charge-discharge instruction value is positive, an instruction of discharge is issued. If the expression (23) is satisfied, the charge-discharge instruction value which gives an instruction of discharge is smaller than the storage battery total power calculated in FIG. 21. Therefore, if the first determination condition is satisfied, the first storage batteries 2a1 to 2a4 included in the first storage battery facility 2a can discharge a discharge power amount instructed in H_BAT_PCom.

The second determination condition is an AND condition of the following expression (24) and expression (25). That is, in a case where both conditions of the expression (24) and the expression (25) are satisfied, the second determination condition is satisfied.

$$H\_BAT\_PCom<0 \quad (24)$$

$$|H\_BAT\_RATED\_POWER-H\_BAT\_POWER|>|H\_BAT\_Pcom| \quad (25)$$

If the expression (24) is satisfied, because the charge-discharge instruction value is negative, an instruction of charge is issued. Through the expression (25), it is determined whether or not the instructed charge power amount can be accepted in free space of the storage battery calculated in FIG. 21. Therefore, if this second determination condition is satisfied, the charge power amount instructed in H_BAT_PCom can be absorbed at the first storage batteries 2a1 to 2a4 included in the first storage battery facility 2a.

In step S280, in a case where neither of the first determination condition and the second determination condition is satisfied, an alarm is issued (step S281). Through this step, it is possible to make a notification that a storage battery charge amount is deficient.

Then, whether or not content of the charge-discharge instruction of this time is an instruction of discharge is determined (step S280a). As described above in the embodiment which is a premise of the present example, if the charge-discharge instruction value is a positive value, the instruction is an instruction of discharge, while, if the charge-discharge instruction value is negative, the instruction is an instruction of charge. Therefore, by detecting a positive/negative sign of H_BAT_PCom, it is possible to determine an instruction of which of discharge and charge is issued.

Figure 30:
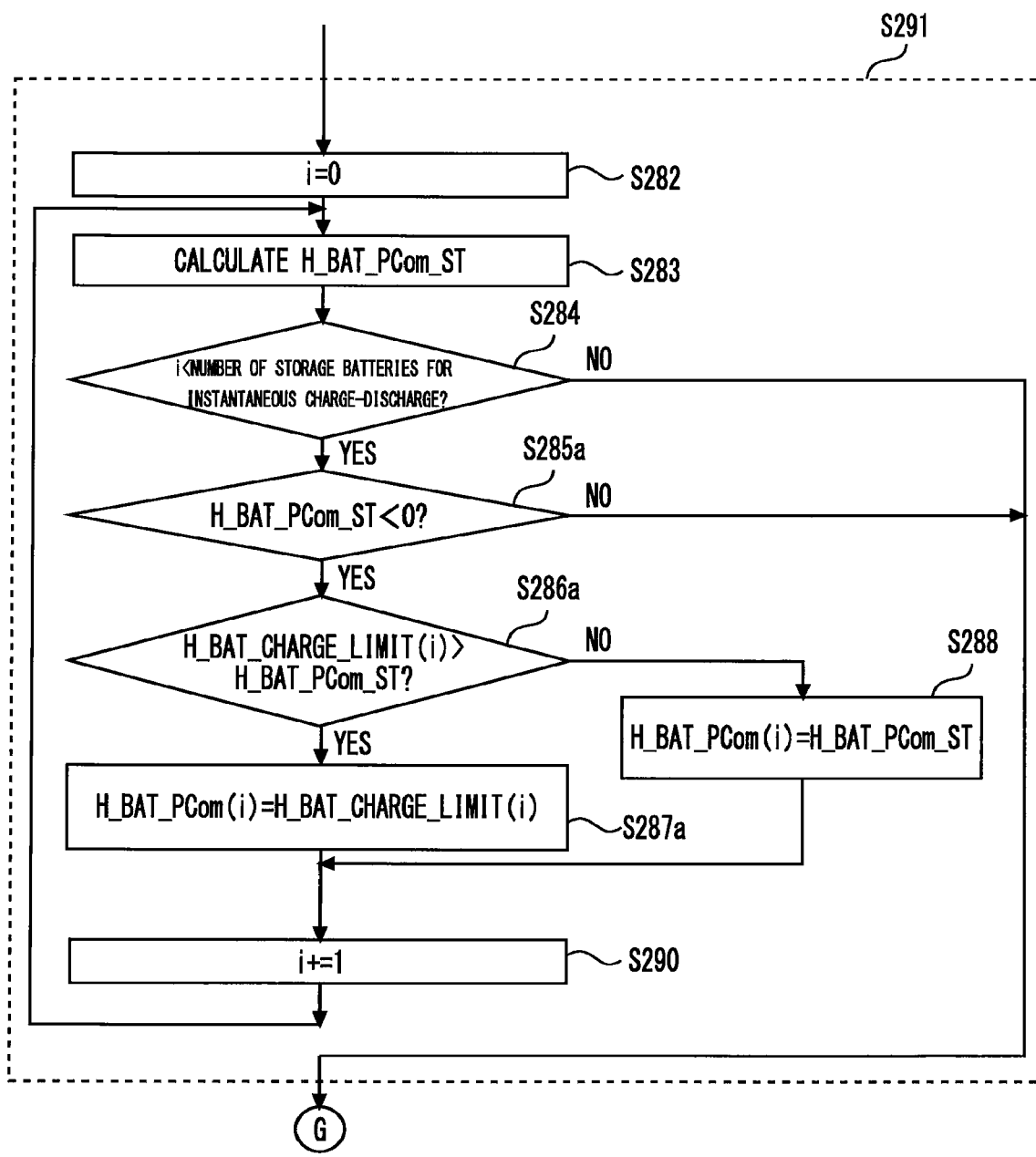
FIG. 30 is a flowchart of the control routine to be executed in the power system according to the example of the present application.

In a case where it is determined in step S280a that the instruction is an instruction of discharge, discharge flow processing from step S282 to S290 which will be described below is executed. Meanwhile, in a case where it is determined in step S280a that the instruction is not an instruction of discharge, the processing proceeds to step S291 and charge flow processing is executed. Details of step S291 is illustrated in FIG. 30, and its content will be described later.

Then, 0 is assigned to i (step S282).

Then, computation processing of dividing a value of H_BAT_PCom is executed (step S283). In the example, because the number of storage batteries for instantaneous charge-discharge is 4, computation processing of dividing the value of H_BAT_PCom by 4 is executed. A value obtained through division is set at H_BAT_PCom_ST.

Then, whether or not i is smaller than the number of storage batteries for instantaneous charge-discharge is determined (step S284). In a case where i is smaller than the number of storage batteries for instantaneous charge-discharge (that is, 4), then, whether or not a value of H_BAT_PCom_ST is greater than 0 is determined (step S285).

Then, through processing from step S286 to S288, limiter processing of imposing a limitation to a value of H_BAT_PCom(i) is performed. H_BAT_PCom (i) is a charge-discharge command to be transmitted to the i-th storage battery.

First, in step S286, processing of reading out H_BAT_DISCHARGE_LIMIT(i) is performed. H_BAT_DISCHARGE_LIMIT(i) is a maximum discharge amount of the i-th storage battery among the first storage batteries 2a1 to 2a4. H_BAT_DISCHARGE_LIMIT(i) is acquired by reading a "discharge limit value" of the i-th storage battery in the storage battery information database 35a illustrated in FIG. 5. Determination processing in the following expression (26) is executed using the readout maximum discharge amount (step S286).

$$H\_BAT\_DISCHARGE\_LIMIT(i)<H\_BAT\_PComST \quad (26)$$

In a case where a determination result of the expression (26) is positive (Yes) in step S286, a charge-discharge instruction of the i-th storage battery is determined on the basis of the following expression (27) (step S287). By this means, it is possible to limit a value of H_BAT_Pcom(i).

$$H\_BAT\_PCom(i)=H\_BAT\_DISCHARGE\_LIMIT(i) \quad (27)$$

In a case where a determination result of the expression (26) in step S287 is negative (No), a divided charge-discharge amount H_BAT_PCom_ST obtained through division is smaller than the maximum discharge amount of the i-th storage battery. Therefore, the i-th storage battery can discharge a discharge power amount instructed in the divided charge-discharge amount H_BAT_PCom_ST. Therefore, a charge-discharge instruction of the i-th storage battery is determined on the basis of the following expression (28) (step S288).

$$H\_BAT\_PCom(i)=H\_BAT\_PCom\_ST \quad (28)$$

Thereafter, i is incremented, and the processing returns to step S283 (step S290). Thereafter, when a determination result of one of step S284 and S285 becomes negative (No), the processing breaks a loop and proceeds to a routine in FIG. 28.

Subsequently, the routine in FIG. 28 will be described. Processing of transitioning to step S292 in the routine in FIG. 28 is computation processing regarding reactive power. First, 0 is assigned to j (step S292).

Then, determination processing indicated in the following expression (29) is executed (step S293). In the expression (29), mpvpcs is the number of PVPCS. mwpcs is the number of wind power PCS. mhbatpcs is the number of PCS of storage batteries for instantaneous charge-discharge. In the present example, as illustrated in FIG. 6, mpvpcs=7, and as illustrated in FIG. 7, mwpcs=7. Further, in the present example, because the number of storage batteries for instantaneous charge-discharge is 4 as illustrated in FIG. 5, mhbatpcs is 4. Therefore, in the present example, whether or not j is smaller than 18 is determined.

$$j<mpvpcs+mwpcs+mhbatpcs \quad (29)$$

In a case where a condition of the expression (29) is satisfied, as indicated in the following expression (30), processing of computing reactive power which can be supplied is executed (step S294). In the expression (30), the reactive power which can be supplied is Q_AVAILABLE. In the present routine, it is assumed that identification numbers are sequentially allocated to a plurality of power conversion apparatuses 20 included in the photovoltaic power generation facility 61, the wind power generation facility 62, and a plurality of storage battery facilities 2a, 2b, 2c, and the plurality of power conversion apparatuses 20 are identified with an identifier j. The reactive power which can be supplied by PCS(j) is reactive power which can be supplied by the j-th power conversion apparatus. "+=" means addition of a value of this time to an integrated value so far.

$$Q\_AVAILABLE\mathrel{+}=\text{reactive power which can be supplied by PCS}(j) \qquad (30)$$

Then, j is incremented in step S295, and the processing returns to step S293. As a result, the processing loops until j becomes 18, and a total value of reactive power which can be supplied by all the power conversion apparatuses 20 is obtained. If j exceeds 18 in step S294, the processing breaks a loop and proceeds to step S296.

Then, an OR condition of the following third determination condition and fourth determination condition is determined (step S296). In a case where one of the third determination condition and the fourth determination condition is satisfied, a determination result of step S296 becomes positive (Yes).

The third determination condition is an AND condition of the following expression (31) and expression (32). If this third determination condition is satisfied, the plurality of power conversion apparatuses 20 can discharge the reactive power amount instructed in H_BAT_QCom.

$$0<H\_BAT\_Q\text{Com} \qquad (31)$$

$$H\_BAT\_Q\text{Com}<Q\_AVAILABLE \qquad (32)$$

The fourth determination condition is an AND condition of the following expression (33) and expression (34)

$$H\_BAT\_Q\text{Com}<0 \qquad (33)$$

$$Q\_AVAILABLE<H\_BAT\_Q\text{Com} \qquad (34)$$

In a case where both the third determination condition and the fourth determination condition are not satisfied in step S296, an alarm is issued (step S297). Through this step, it is possible to make a notification that charge-discharge capability of the storage battery is deficient.

Then, 0 is assigned to k (step S298). k is an identifier similar to i and j.

Then, determination processing indicated in the following expression (35) is executed (step S299). This step is a step similar to step S293, and whether or not k is smaller than 18 is determined.

$$k<mpvpcs+mwpcs+mhbatpcs \qquad (35)$$

In a case where a condition of the expression (35) is satisfied, processing indicated in the following expression (36) is executed (step S300). Identification numbers are sequentially allocated to the plurality of power conversion apparatuses 20 as described above. In this step, the plurality of power conversion apparatuses 20 are identified using an identifier k. PCS(k) is the k-th power conversion apparatus. Q_PCS(k) is a Q output command value of PCS(k). ktotal is the number of PVPCS+the number of wind power PCS+the number of PCS of storage batteries for instantaneous charge-discharge. In the present example, ktotal is 18.

$$Q\_PCS(k)=Q\_AVAILABLE/k\text{total} \qquad (36)$$

Then, k is incremented in step S301, and the processing returns to step S299. As a result, the processing loops until k becomes 18, and the Q output command value for all the power conversion apparatuses 20 is calculated. If k exceeds 18 in step S299, the processing breaks a loop, and the routine of this time ends.

Note that, because there is only one storage battery for medium-term charge-discharge in the present example, when a charge-discharge instruction is issued to the second storage battery facility 2b, computation of dividing the charge-discharge amount as indicated in FIG. 27 described above does not have to be performed. That is, the second storage battery facility 2b only requires to be controlled on the basis of M_BAT_PCom calculated in the routine in FIG. 24.

Meanwhile, in a case where the power system 1 including a plurality of types of storage batteries for medium-term charge-discharge is provided as a modified example, it is only necessary to issue a charge-discharge instruction to the second storage battery facility 2b by modifying the above-described FIG. 27 and FIG. 28. In this case, in FIG. 27 and FIG. 28, it is only necessary to make modifications such as change of the storage battery for instantaneous charge-discharge to a storage battery for medium-term charge-discharge, substitution of M_BAT_PCom for H_BAT_Pcom and substitution of M_BAT_PCom_ST for H_BAT_P-Com_ST.

Figure 29:
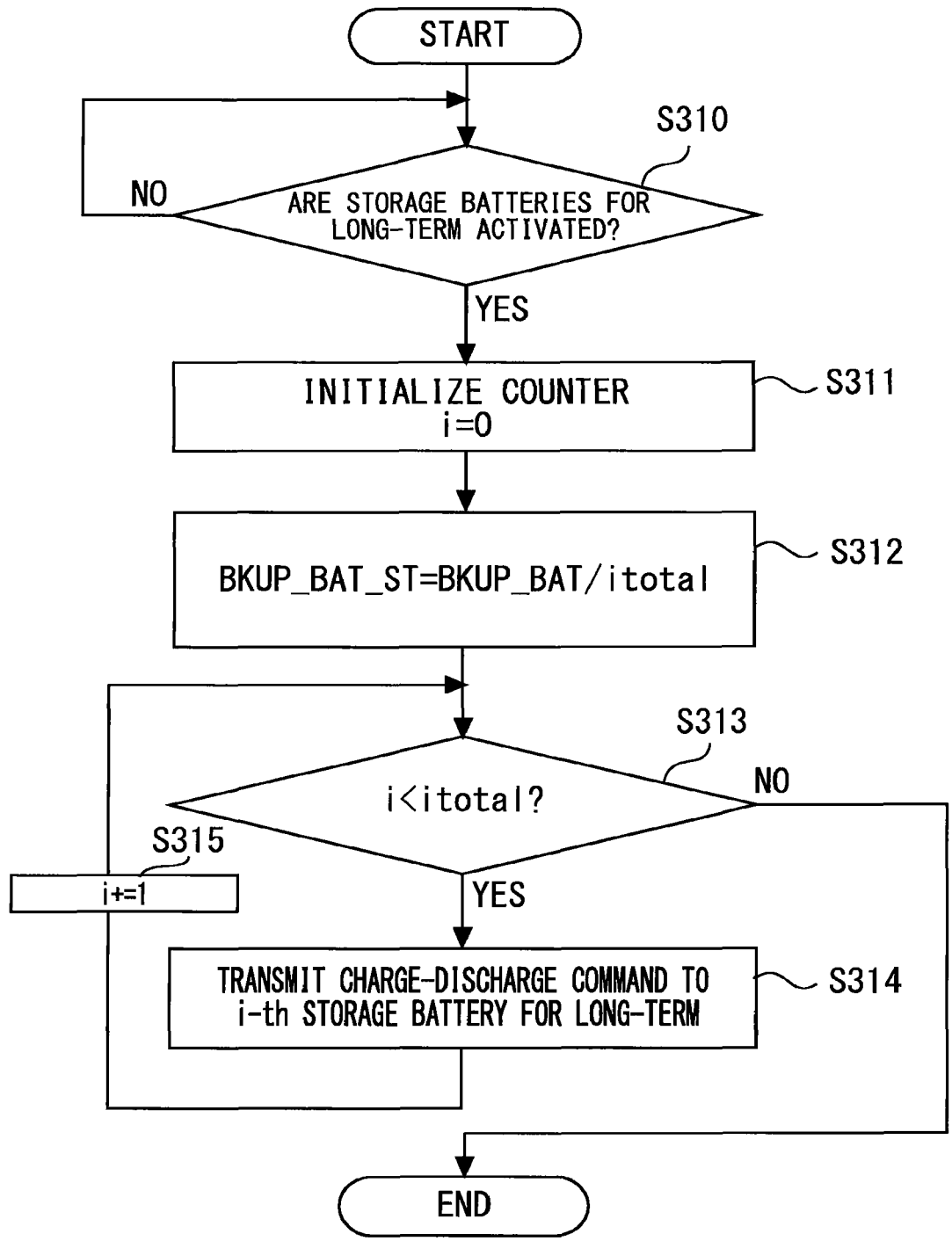
FIG. 29 is a flowchart of the control routine to be executed in the power system according to the example of the present application.

FIG. 29 is processing for outputting a storage battery control command during power outage. Note that BKUP_BAT is a charge-discharge amount. The charge-discharge amount is determined by a difference between total generated power and power consumption. The total generated power is a total amount of power generated by the photovoltaic power generation facility 61 and the wind power generation facility 62 in the present example. Charge-discharge by the storage batteries for long-term charge-discharge is performed on the basis of this charge-discharge amount.

In the routine in FIG. 29, first, whether or not the storage batteries for long-term charge-discharge are activated is determined (step S310). If activation of the third storage batteries 2c1, 2c2 is completed, a condition of this step is satisfied.

In a case where the condition of step S310 is satisfied, then, a counter is initialized (step S311). "i" indicating a counter value is reset to 0.

Then, processing of dividing the charge-discharge amount is executed in accordance with the following expression (37) (step S312). itotal is the number of storage batteries for long-term charge-discharge, and, in the present example, itotal=2. BKUP_BAT_ST is the charge-discharge amount after division.

$$BKUP\_BAT\_ST=BKUP\_BAT/i\text{total} \qquad (37)$$

Then, determination processing of the following expression (38) is executed (step S313).

$$i<i\text{total} \qquad (38)$$

If i does not exceed itotal, a charge-discharge command is transmitted to the i-th storage battery for long-term charge-discharge (step S314). The charge-discharge command is a signal for causing charge-discharge instructed in the above-described BKUP_BAT_ST to be performed.

Then, i is incremented, and the processing returns to step S313. Through the processing from step S313 to step S315, the charge-discharge command is transmitted to all the storage batteries for long-term charge-discharge. If the processing breaks a loop in step S313, thereafter, the routine of this time ends.

FIG. 30 is a flowchart illustrating charge flow in step S291 in FIG. 27. While a value of H_BAT_PCom is positive during discharge, the value of H_BAT_PCom becomes negative during charge. Further, content from step S285 to step S287 is replaced with content from the following step S285a to step S287a. The processing from step S282 to step S285 and step S287 to step S290 illustrated in FIG. 27 is also executed in a similar manner in FIG. 30 except these points.

In step S285a, whether or not the value of H_BAT_P-Com_ST calculated in step S283 is a negative value is determined. In step S286a, processing of reading out H_BAT_CHARGE_LIMIT(i) is performed. H_BAT_CHARGE_LIMIT(i) is a maximum charge amount of the i-th storage battery among the first storage batteries 2a1 to 2a4. H_BAT_CHARGE_LIMIT(i) is acquired by reading the "charge limit value" of the i-th storage battery in the storage battery information database 35a illustrated in FIG. 5. Determination processing of the following expression (38) is executed using the readout maximum charge amount (step S286a). Note that H_BAT_PCom_ST is a negative value during charge, and a value of BAT_CHARGE_LIMIT(i) based on the charge limit value in FIG. 5 is also a negative value.

$$H\_BAT\_CHARGE\_LIMIT(i) > H\_BAT\_PCom\_ST \quad (38)$$

In a case where a determination result of the expression (38) is positive (Yes) in step S286a, a charge-discharge instruction of the i-th storage battery is determined on the basis of the following expression (39) (step S287a). When the determination result of the expression (38) is positive, a value of H_BAT_PCom_ST exceeds a value of H_BAT_CHARGE_LIMIT(i) on a negative side. Therefore, it is possible to limit the value of H_BAT_PCom(i) using the following expression (39).

$$H\_BAT\_PCom(i) = H\_BAT\_CHARGE\_LIMIT(i) \quad (39)$$

In the above-described example, an example of specific control content, or the like, of the power system 1 according to the embodiment has been described. In various kinds of data in FIG. 5 to FIG. 11 and the flowcharts of the control routines illustrated in FIG. 12 to FIG. 30 according to the example, some pieces of information or some steps may be omitted as necessary. Further, other arbitrary pieces of information or arbitrary steps may be added.

REFERENCE SIGNS LIST

1 Power system
2a Storage battery facility (first storage battery facility)
2b Storage battery facility (second storage battery facility)
2c Storage battery facility (third storage battery facility)
2a1 to 2a4 First storage battery
2b1 Second storage battery
2c1 to 2c2 Third storage battery
3 Multi-storage battery control apparatus
4 Electric power grid
5 Meter
6 Renewable energy power generation facility
7a First load
7b Second load
8 Grid side switching apparatus
9 Switching apparatus
20 Power conversion apparatus
20a Inverter circuit
20b Inverter control circuit
31 Grid stabilizing control unit
31a Photovoltaic power generation status database
31b Wind power generation status database
32 Power outage backup control unit
33 Load reduction control unit
33a Load status database
33b Load plan database
33c Load plan setting information
34 Storage battery charge-discharge logic unit
34a Application-based charge-discharge amount determining unit
34b Storage battery-based charge-discharge amount determining unit
35 Storage battery control unit
35a Storage battery information database
61 Photovoltaic power generation facility
61a Solar cell array
62 Wind power generation facility
62a Wind power generator
100 Storage battery body
102 Storage battery management unit

The invention claimed is:

1. A power system comprising:
a plurality of storage battery facilities; and
a multi-storage battery control apparatus configured to control the plurality of storage battery facilities,
wherein the plurality of storage battery facilities comprise a first storage battery facility including at least one first storage battery, and a second storage battery facility including at least one second storage battery, the first storage battery being different from the second storage battery in type,
the multi-storage battery control apparatus is constructed to selectively use the first storage battery facility or the second storage battery facility in accordance with a plurality of different types of charge-discharge application,
the multi-storage battery control apparatus is constructed to respectively calculate a first charge-discharge amount for first charge-discharge application and a second charge-discharge amount for second charge-discharge application different from the first charge-discharge application, control charge-discharge of the first storage battery facility on a basis of the first charge-discharge amount, and control charge-discharge of the second storage battery facility on a basis of the second charge-discharge amount,
the multi-storage battery control apparatus is constructed to execute:
processing of acquiring the first charge-discharge amount as normal operation application while power outage does not occur at an electric power grid which is interconnected to the plurality of storage battery facilities;
processing of acquiring the second charge-discharge amount as backup application while power outage occurs at the electric power grid;
processing of, in a case where power outage does not occur at the electric power grid, controlling charge-discharge of the first storage battery facility on a basis of the first charge-discharge amount and setting a charge-discharge amount of the second storage battery facility at 0; and
processing of, in a case where power outage occurs at the electric power grid, setting a charge-discharge amount of the first storage battery facility at 0 and controlling charge-discharge of the second storage battery facility on a basis of the second charge-discharge amount.

2. The power system according to claim 1,
wherein the plurality of storage battery facilities include a different type mixed storage battery facility including a plurality of different types of storage batteries, and
the multi-storage battery control apparatus is further constructed to execute:
processing of acquiring respective pieces of storage battery information of the plurality of storage batteries included in the different type mixed storage battery facility, and computing combined storage battery information by combining the acquired respective pieces of storage battery information to one piece; and processing of diagnosing a state of the different type mixed storage battery facility on a basis of the combined storage battery information.

* * * * *